(12) United States Patent
Soter

(10) Patent No.: US 12,469,379 B2
(45) Date of Patent: Nov. 11, 2025

(54) BEACH SAFETY DEVICES, SYSTEM AND METHODS OF USE

(71) Applicant: Jacob Soter, Marquette, MI (US)

(72) Inventor: Jacob Soter, Marquette, MI (US)

( * ) Notice: Subject to any disclaimer, the term of this patent is extended or adjusted under 35 U.S.C. 154(b) by 0 days.

(21) Appl. No.: 18/521,003

(22) Filed: Nov. 28, 2023

(65) Prior Publication Data

US 2024/0096202 A1 Mar. 21, 2024

Related U.S. Application Data

(63) Continuation of application No. PCT/US2022/035018, filed on Jun. 24, 2022.
(Continued)

(51) Int. Cl.
*G08B 25/14* (2006.01)
*B63C 9/20* (2006.01)
(Continued)

(52) U.S. Cl.
CPC ............ *G08B 25/14* (2013.01); *B63C 9/20* (2013.01); *G01W 1/02* (2013.01); *G08B 7/06* (2013.01);
(Continued)

(58) Field of Classification Search
CPC ...... G08B 25/14; G08B 21/084; G08B 25/12; G08B 21/10; B63C 9/20; G01W 1/02; G01W 2203/00; H04L 51/04
See application file for complete search history.

(56) References Cited

U.S. PATENT DOCUMENTS

| 6,558,218 B1 * | 5/2003 | Hansen | B63C 9/01 441/80 |
| 6,935,911 B1 * | 8/2005 | Stewart | B63C 9/22 441/89 |

(Continued)

FOREIGN PATENT DOCUMENTS

| CN | 103634570 A | 3/2014 |
| KR | 101895213 B1 | 9/2018 |
| KR | 101895215 B1 | 9/2018 |

OTHER PUBLICATIONS

International search report completed Oct. 4, 2022, International Application No. PCT/US22/35018.
European search report released Mar. 27, 2025 related to patent family.

*Primary Examiner* — John A Tweel, Jr.
(74) *Attorney, Agent, or Firm* — DEVICE PATENT LLC

(57) ABSTRACT

Disclosed in this document are beach safety devices, beach safety systems, and methods of use referred herein as BSDS. The BSDS utilizes various connected, electronic tools that improve the safety, operational efficiency, and emergency response time of a designated beach. In one form, the BSDS utilizes a visual warning system utilizing a colored warning light language. The BSDS comprises at least one central command tower CCT having various combinations of warning lights, audio generator, an emergency button, a life ring handle detector, and a beach monitoring module to process and initiate a response to beach condition data and emergency signals. Some embodiments further comprise one or more zone emergency towers networked with the CCT that are spread across the beach front or pier to extend the safety coverage across the beach. Other BSDS peripherals include a life ring node, a modular buoy node, a sensor buoy node.

22 Claims, 16 Drawing Sheets

Related U.S. Application Data

(60) Provisional application No. 63/214,712, filed on Jun. 24, 2021.

(51) Int. Cl.
  *G01W 1/02* (2006.01)
  *G08B 7/06* (2006.01)
  *G08B 21/08* (2006.01)
  *G08B 25/10* (2006.01)
  *G08B 25/12* (2006.01)

(52) U.S. Cl.
  CPC ........... *G08B 21/084* (2013.01); *G08B 25/10* (2013.01); *G08B 25/12* (2013.01); *G01W 2203/00* (2013.01)

(56) References Cited

U.S. PATENT DOCUMENTS

| | | | | |
|---|---|---|---|---|
| 8,237,574 | B2* | 8/2012 | Anderson | G08B 21/086 |
| | | | | 340/541 |
| 8,502,686 | B2* | 8/2013 | Annunziato | G08B 27/00 |
| | | | | 73/170.16 |
| 9,443,207 | B2* | 9/2016 | Przybylko | G06Q 10/00 |
| 11,136,097 | B2* | 10/2021 | Sandberg | B63B 79/15 |
| 11,952,088 | B2* | 4/2024 | Ökvist | B64D 47/02 |
| 2010/0052891 | A1 | 3/2010 | Chainer et al. | |
| 2011/0312341 | A1 | 12/2011 | Moton, Jr. et al. | |
| 2014/0111332 | A1 | 4/2014 | Przybylko et al. | |
| 2014/0368347 | A1* | 12/2014 | White | G08B 25/12 |
| | | | | 340/601 |

\* cited by examiner

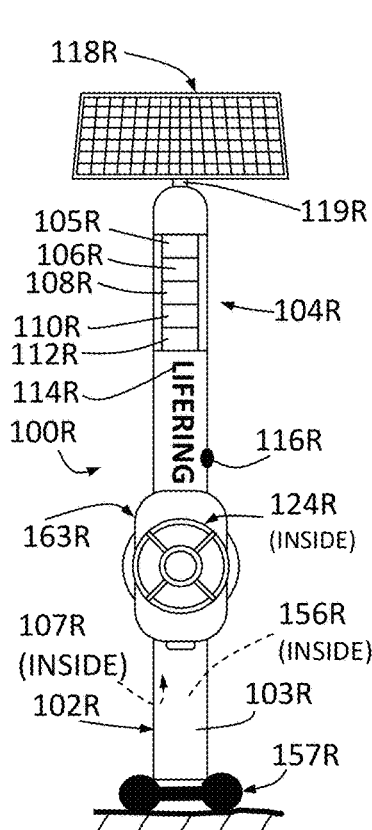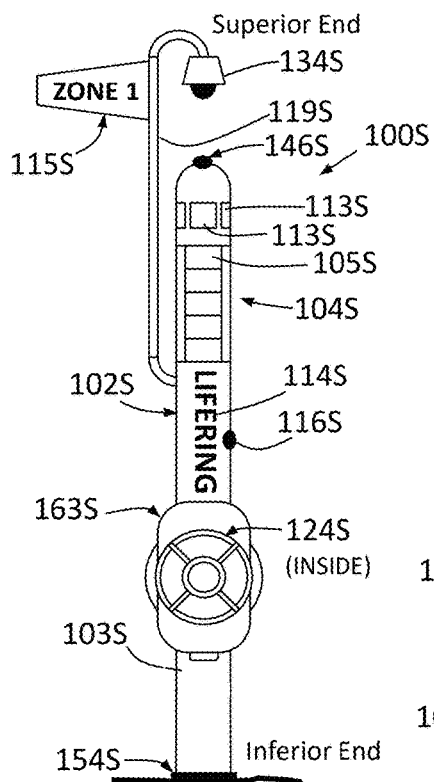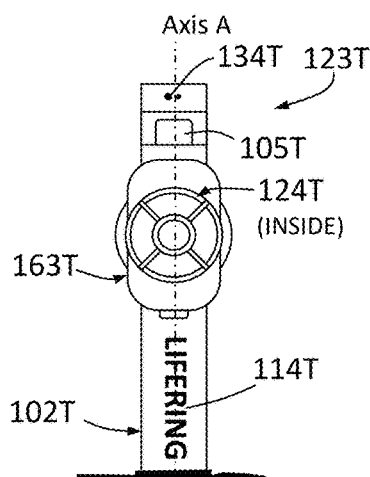
FIGURE 1C
FIGURE 1D
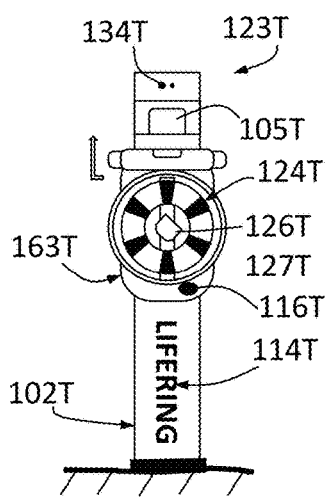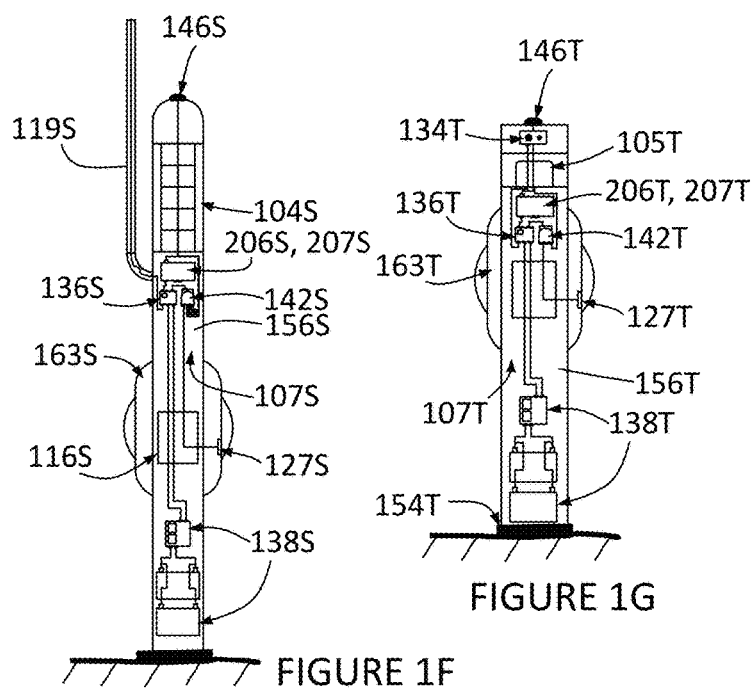
FIGURE 1E
FIGURE 1F
FIGURE 1G

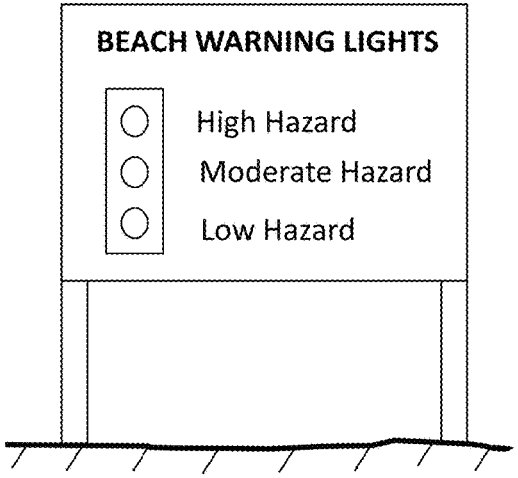
FIGURE 2
- LAN - Local Area Network
- WLAN - Wireless LAN
- WAN - Wide Area Network
- WWAN - Wireless WAN
- LPWLAN - Low Power WLAN
- LPWWAN - Low Power WWAN
──────── 202-Private LAN
── · ── · ── 204/206-Public WLAN/WWAN
──── · ──── 205-Private WLAN
· · · · · · · 207/208-Private WWAN/WAN
── ── ── 210-Short Range Private Network
─── ─── ─── 212-Long Range Private Network
FIGURE 3
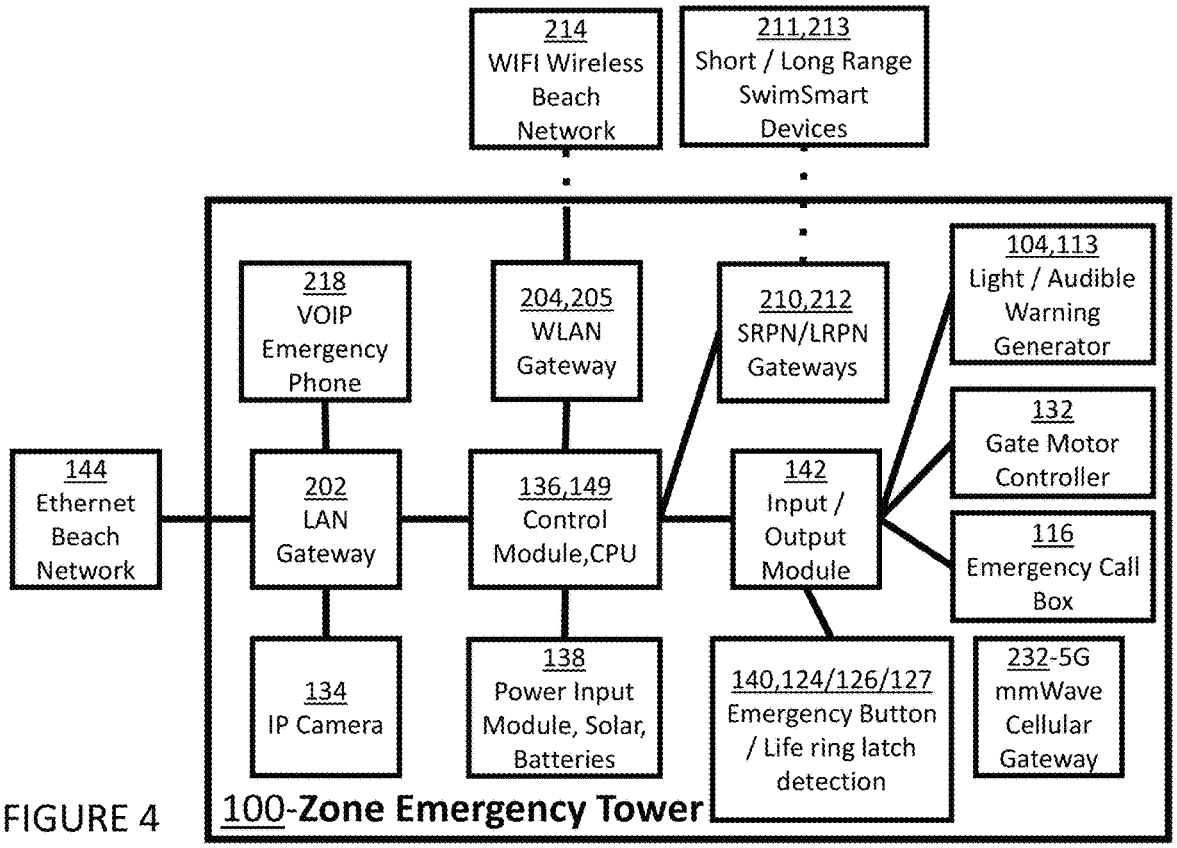
FIGURE 4

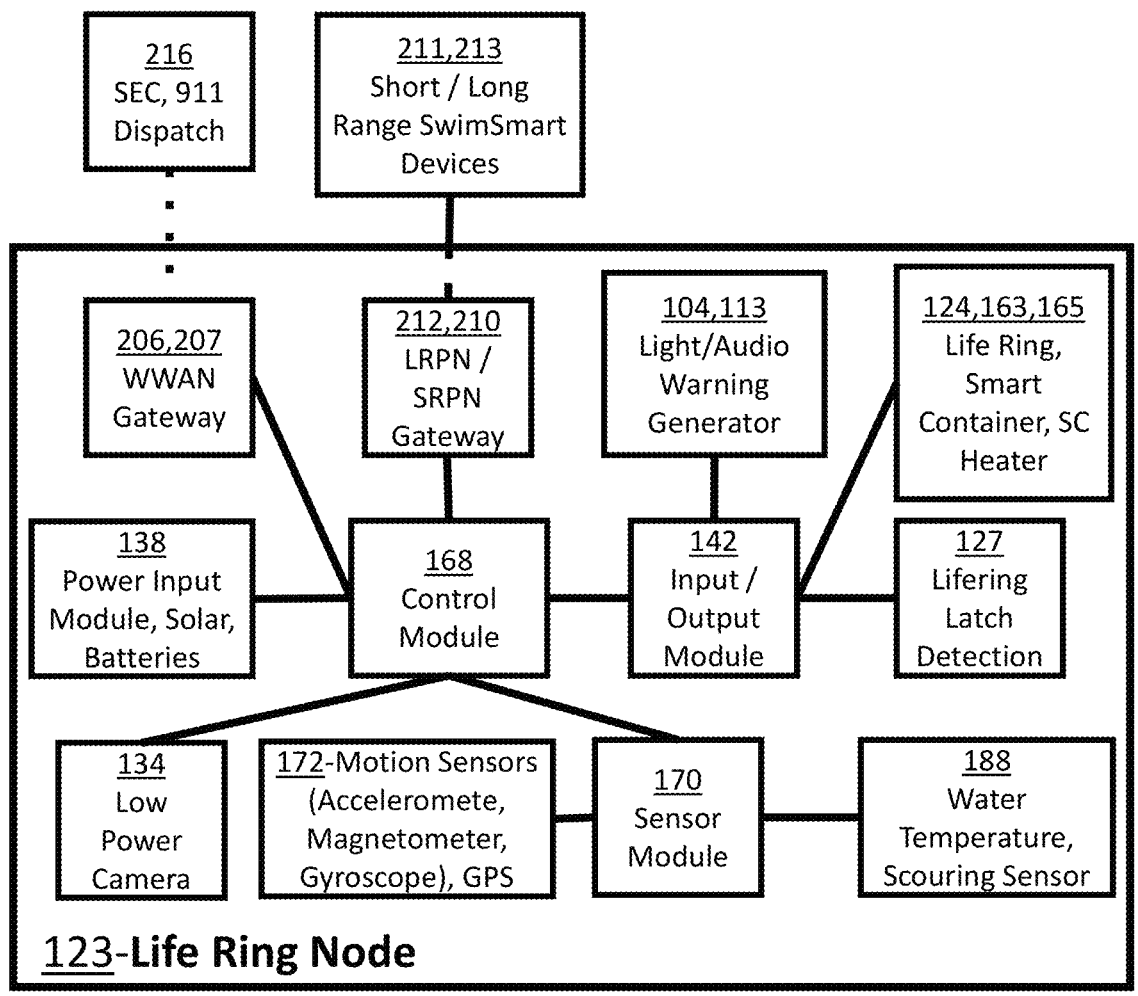
FIGURE 11
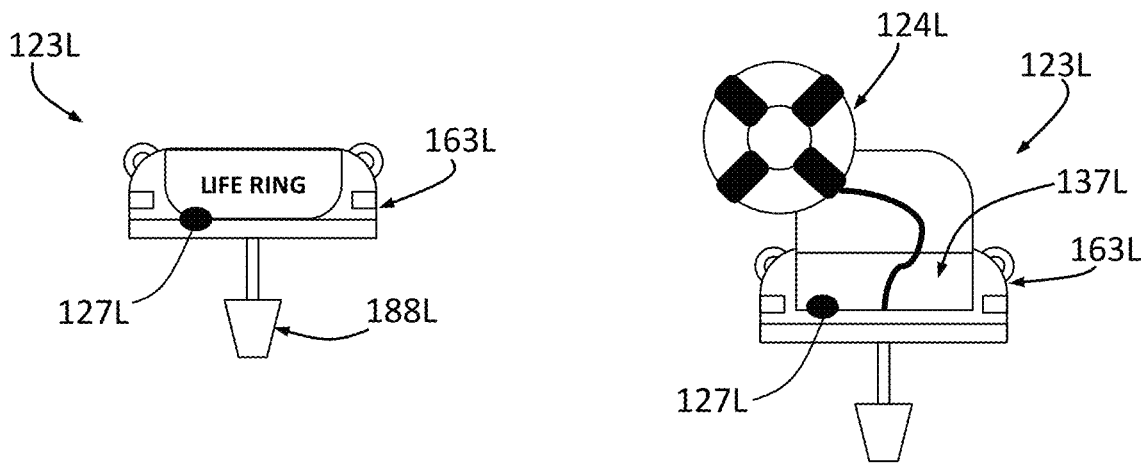
FIGURE 12A
FIGURE 12B

BEACH SAFETY DEVICES, SYSTEM AND METHODS OF USE

CROSS REFERENCE TO RELATED APPLICATIONS

This Non-Provisional Patent Application claims priority to International Patent Application No. PCT/US2022/035018 filed Jun. 24, 2022 which claims benefit to U.S. Provisional Patent Application No. 63/214,712 filed Jun. 24, 2021, the entire disclosures of which are hereby incorporated by reference and relied upon.

BACKGROUND OF THE INVENTION

Field of the Invention. The invention relates generally to beach safety, and more particularly to devices, systems, and methods for beach safety.

The beach safety industry is fragmented and characterized by beaches having very different safety approaches in different countries around the world. In the United States, the approaches vary in different states and often between various locations in individual states. Beach dangers such as rip currents has remained somewhat misunderstood, and it has been only more recently that the mechanics of rip currents have been answered and documented. Beach warning systems that alert beach goers of varying levels of dangers has traditionally been by use of colored flags elevated at flag poles positioned on the beach. Typically, a green flag is flown signaling low risk, a yellow flag signaling medium risk, and a red flag signaling high risk. In some cases, other flag signals are used whereby a double red flag signals the beach is closed, and a purple flag signals the presence of marine pests such as jellyfish or other dangerous fish. The flag system has been helpful to beach safety but is a very ineffective use of resources. Since the flags are typically changed by hand, there is an enormous payroll expense associated with the process. In addition, since weather changes rapidly, the flag changing response tends to be slow, inefficient, and frequently not representative of current beach conditions. Flags however, also have other limitations. Since flags must be changed manually, there are limitations as to how many flags can be on a beach due to the cost of resources to change the flags. Because of this, beachgoers may not notice the flags unless they make a point of looking for them. This again results in elevated danger due to beachgoers not being aware of changing weather danger.

Frequently, the beach risk levels are based on weather station sensors located several miles away. In many cases, these sensors fail to accurately determine the conditions occurring at a beach spaced from the weather station. The fact remains however, from 2005-2014, there were an average of 3,536 fatal unintentional drownings annually in the United States according to the CDC. This is a rate of approximately 10 deaths per day. About 1,000 of these drownings each year are children and 43% of these occur in open water. In addition, 7,000 more children are sent to hospital emergency rooms. Many of these incidents are related to rip currents which has led to a 12 year average (2002-2018) of 30 rescues and 12 rip current related deaths per year just on the Great Lakes. This loss of precious life is tragic with nearly 150 families impacted per week across the country. However, the losses due to drowning incidents does not end there. According to the Coast Guard Ninth District, the Great Lakes averages 2,500 search and rescue (SARs) operations per year. Hourly rates for these rescues range from $27/hour to $733/hour for each US Coast Guard personnel involved, and between $1,222/hour and $17,293/hour for use of Coast Guard equipment such as boats and helicopters. The bottom line is that a single SAR can cost upwards of $1 M.

What is needed are beach safety systems that signal beachgoers of the real-time beach conditions at any given time with reduced use of human resources. What is needed are beach safety systems that utilize and communicate to beachgoers advanced weather data gathered from the reliable weather agencies such as the National Weather Service to assist helping beach administrators and the public make decisions about safe beach use. What is needed are beach safety systems that utilize not just basic data such as wind speed and wave height, but rather beach safety systems that utilize predictive data such as algorithms that combine wave height, angle of approach, wave period, and meteotsunami potential to provide an advanced determination of swim risk related to the intensity of dangerous currents.

What is needed are weather systems that utilize data from sensors at the site of interest rather than from a weather station located miles away.

What is needed is a rules engine that considers data from any variety of sources such as the weather service, sensors on location, National Weather Service predictive charts, and special aspects of a beach (i.e., a break wall, a pier), that helps a beach owner or the National Weather Service give smart guidance to beachgoers regarding beach safety. A pier for example, pointed in a particular direction can present an unusually high level of risk due to rip currents. Utilizing this information from a variety of sources provides beach owners smart decision making regarding safe beach access.

What is needed are beach danger alert systems that are difficult to ignore due to their obvious presence on the beach and that rely on other forms of media aside from a colored flag to gain the attention of beachgoers.

What is needed are methods for swimmers to issue real time emergency signals to first responders and assistance in performing rescues.

SUMMARY

In response to needs outlined above, disclosed herein are beach safety devices, a beach safety system, and methods of use referred herein as BSDS. To resolve any confusion, listed and described below are definitions of key words and device connection types that have been utilized in this disclosure.

General Definitions

Beach Admin—Short for beach administrator(s), these are individuals who serve as technical administrators of the beach network. Beach admins have the highest privileges for maintaining and controlling the BSDS equipment and the communication channels between them.

Beach Manager—Any designated individual who has restricted permissions to the BSDS given by the beach admin. Beach managers have access to specific functions or aspects of the beach network. Some beach managers can be designated for controlling specific parts of the BSDS, while others can be given specific privileges for maintenance of the BSDS.

CANbus—(controller area network bus)—A bus standard that allows microcontrollers and devices to communicate with each other's applications without a host computer.

Directly Cloud Enabled (DCE)—A device in the BSDS that is directly connected to the SEC (system engine cloud) of the BSDS using a (W)WAN (wired and/or wireless wide area network) radio that is contained within the BSDS device. This communication channel may be used as a primary, secondary, backup, or emergency communication method.

Emergency Issuance—Engaging a BSDS device to issue an emergency signal to the SEC (system engine cloud) and any local beach staff.

External/Outside—These words refer to the scope outside of an individual BSDS beach network. This refers to either the BSDS (W)WAN which connects an individual beach network to the SEC, or a public WWAN like cellular towers where the base stations are not connected to, or associated with, the BSDS beach network.

Helical Pier—Large screw-like support structures that dig deep underground to solidify a foundation on a volatile base.

I/O—Communication between an information processing system, such as a computer, and the outside world (I.e., devices not part of the BSDS).

Internet Protocol (IP)—The principal communications protocol in the Internet protocol suite for relaying datagrams across network boundaries thereby essentially establishing the Internet.

Local/Internal/Beach—these words refer to the scope of an individual BSDS beach network's WLAN (wireless local area network)/LAN (local area network)/SRPN (short range private network)/LRPN (long range private network) reach. The (W)WAN (wired and wireless wide area network) connects an individual beach network to the outside world (external). There can be multiple (W)WAN exit points in a beach network. 'Internal' refers to everything within the immediate BSDS.

Radio Node—Any device that contains a radio that can pass a desired signal up the network. This applies for all communication types, frequencies, and methods. Peripheral devices require connectivity to a radio node to connect to the internal networks.

Rules engine—Software that executes predefined rules according to an algorithm. In a BSDS for example, data from sensors measuring wave height is compared to predefined rules in an algorithm which can cause consequent actions of the BSDS (i.e. warning light activation). This allows the BSDS to manage itself without requiting use of the system engine cloud.

Smart Beach—A beach utilizing smart infrastructure technologies with advanced data analytics and machine learning to generate real-time and forecasted beach safety information to beach owners and users.

System Engine Cloud (SEC)— A safety system software engine used in the BSDS that exists outside of the immediate beach where the BSDS is implemented. The SEC performs operations such as maintaining and monitoring devices, performing application specific tasks and functions, communicating with external devices or individuals, and storing and disseminating desired information.

User Equipment (UE)—devices used by the public that do not act as a repeater of the utilized network protocol. These devices are not considered part of the commercial BSDS. Examples include: laptop, cellphone, tablet, smart watch, etc.

Voice Over IP (VOIP)—transmits voice or multimedia sessions over the internet.

Definitions of Device Connection Types

Local area network (LAN) when used in the BSDS typically refers to LAN that is confined to the beach being monitored by the BSDS.

Wide area network (WAN) as used herein refers to using base stations, satellites, or other communication devices outside the scope of the BSDS beach to interact with the internet. The SRPN and LRPN are also scoped to the immediate smart beach and are not considered DCE.

Private Local Area Network (LAN)—This network is a hard-wired internet protocol (IP) based locally scoped network. The most common carrier of LAN communications is ethernet cabling. If desirable by the BSDS device network, this LAN structure could be non-IP based with a serial, CAN, or other wired communication structure. The word private is appended from LAN because the general public would not have access to the hard-wired access ports, unless designated access points are desired. This communication type is solely used for hardwiring the BSDS and other designated operational devices to the beach network. The private LAN applies to only BSDS internet connected devices that are under the direct jurisdiction of beach admin(s).

Private Wireless Local Area Network (WLAN)—This network is a wireless IP based locally scoped network. The most common implementation of WLAN communications is a WiFi network. If desirable by the BSDS device network, this WLAN structure could be non-IP based using Bluetooth Low Energy (BLE), other Bluetooth tangents, Thread, Zigbee, other mesh, round-robin, or any other multipoint wireless communication topology. The word private in (WLAN) is appended because the general public would not be able to connect to this wireless network. WLAN may either be an entirely separate protocol or a subset of the WiFi spectrum set aside, with precedent, for system communications. The private WLAN is used to connect beach owned and managed user equipment (UE) such as other safety devices (towers, buoys, rings), other safety equipment (e-buttons, callboxes, cameras) or other desired business operation devices such as ATMs, vending machines, POS terminals, smart trash cans, system management terminals, etc.

Public WLAN—this network is the dominant omnipresent communication protocol for the general public, namely WiFi, or any other replacement thereof. The public WLAN is used to connect the general public's UE (user equipment) chiefly their phones, tablets, or laptops to the public internet. In the event of network congestion, the public internet will be restricted first. The public internet, similar to Boingo® hotspots at the airport, can have a desired registration process or ad space when connecting said device. The public and private WLAN structure enables BSDS protected beaches to become smart beaches.

Smart devices (those best used in loose or solid ground)— Examples include trash cans, lifeguard towers, beach chairs, umbrellas, canopies.

Smart devices (those best used in solid ground)—smart meters, POS (point of service) terminals, kiosks, vending machines, advertisement TV.

Wide area network (WAN) is fiber optic/DSL, that brings internet from the outside world to a home/office or other structure. A router is the interface between the internet from the outside world delivering hardwired internet into these buildings.

Wireless Wide Area Network (WWAN)— WWAN is a wireless IP based long range network. The most common implementation of WWAN communications is a cellular network. (W)WAN communication methods are the only DCE (directly cloud enabled) communication methods as the SEC exists in the IP-based cloud and thus some form of W(WAN) is required to communicate. This direct communication channel is useful for issuing important information if the local network fails or experiences other downtime. WWAN towers can be extended with public cellular antennas just like WiFi antennas. This is especially useful in the case of mmWave 5G and any other protocol using extremely high frequencies which require antennas closer to the UE. Nonetheless, traditional frequency cellular antennas, or any other omnipresent protocol replacement thereof, can be integrated into the existing network architecture. Various embodiments of the BSDS utilize these WWAN gateways.

Low power wide-area network (LPWAN)—LPWAN radios act in unison in order to mitigate the overall communication energy overhead thereby conserving power and battery life. For example, LPWAN radios can be set with a prescribed radio wake and sleep time to conserve energy.

Short Range Private Network (SRPN)—SRPN is a non-IP based short range communication network that can be either wireless or hard-wired. The SRPN is a segregated frequency channel that will not experience unwanted interference or congestion unlike other public frequencies. In some embodiments, SRPN is used to communicate between specific devices in the BSDS to facilitate the transmission of application specific signals such as emergency signals for example. The SRPN can be either the primary, or backup, communication channel for the fundamental operational communication between BSDS devices. The SRPN is useful for connecting devices such as towers (I.e., ZET), life ring nodes (LRN), and buoys (I.e. sensor buoy node, modular buoy node) together that are within the required communication range.

Long Range Private Network (LRPN)—LRPN is a non-IP based long range communication network. This communication network can be either wireless or hard-wired. The LRPN is a segregated frequency channel that will not experience unwanted interference or congestion unlike other public frequencies. This long-range private network is used to communicate between BSDS specific devices to facilitate the transmission of application specific signals such as emergency signals for example. The LRPN can be either the primary, or backup, communication channel for the fundamental operational communication between BSDS devices. The LRPN is useful for connecting faraway devices such as remote towers, buoys, or life ring nodes to the system network. CCTs (central command towers) from entirely separate beach BSDSs can be linked together using LRPN in the event of a loss of all (W)WAN connectivity on a given beach, or used as a communication piggyback for extremely remote locations.

SRPN and LRPN networks provide a segregated system for device specific operations. Although regulated SRPN/LRPN networks also exist and can be utilized, the SRPN and LRPN networks are often free and open and therefore often unregulated from the FCC spectrums and can typically run with minimal interference from the IP-based communications. SRPN and LRPN are dedicated channels that can be used to connect the BSDS buoys and life rings back to the central command tower in the BSDS while not overlapping with WIFI. For this reason, these networks experience little noise interference.

Further summary of beach safety devices, system, and methods (BSDS) as disclosed herein is as follows.

In one form, a BSDS utilizes various different connected, electronic tools that improve the safety, operational efficiency, and emergency response time of a designated beach.

In one form, the BSDS is a combination system combining an emergency system having components that can be used, in common with a non-emergency signaling system such as non-critical process monitoring, paging, and/or operations automation.

In one form, tools used in the BSDS range from visual and audible alerting devices, cameras, emergency call boxes and buttons (which can be in the form of a switch), smart life rings and buoys, automated gates and various other sensor devices that act in unison to perform safety related functions and tasks.

In one form, the BSDS utilizes a visual warning system having a colored warning light language where green indicates a low swimming risk situation, yellow a medium, and red a high risk swimming situation. A flashing, or two independent red lights indicate that swimming is not allowed on the section of the beach. Other colors such as purple can be used to signify the presence of harmful marine life such as jellyfish. A blue light can be used to designate a life ring or the presence of flotation or other emergency equipment or a current emergency. A white light can signify medical equipment or the presence of harmful water contaminants such as HAB's or oil.

In one form, the BSDS includes onboard computers of all equipment on the beach connected to a beach network structure whereas the computers can communicate with each other. In some embodiments, this includes the ability to upgrade the software of such BSDS devices at any time.

In one form, the BSDS uses a proprietary security infrastructure as the bearer for public and private WLAN radios/extenders. The public WLAN extends to the various public peripherals and user devices. The public WLAN is a subset of the overall WLAN, with the private WLAN taking precedent. The entire WLAN environment is monitored through the same backend infrastructure.

In one form, a BSDS peripheral device can be appended with desired sensors and can be connected to the same communication network structure. Thus, sensors that can successfully function as desired can be attached to any of the peripheral devices. These are devices connected to the BSDS via either public or private channels.

In one form, a BSDS is designed around a network structure whereby each individual BSDS peripheral device runs application specific firmware while tied to a central command tower on the beach where further processing of information can be done.

In one form, helical piers can be used as a foundational structure for erecting zone emergency towers or other equipment in a BSDS on the soft beach where poured foundations are not desired.

In one form, a BSDS utilizes one or more of: visual media such as colored lights, and audio media such as one or more of buzzers, sirens, and vocal alarms. The vocal alarms can convey a message such as 'dangerous rip currents are present, stay out of the water or you will be ticketed'.

In one form, the magnitude of sound and/or light of a BSDS is adjustable to increase or decrease lumens for light and to increase or decrease decibels for sound.

In one form, the BSDS utilizes a variety of methods to connect between BSDS devices in the system including but not limited to Bluetooth, cellular, ethernet, and fiber optic (also termed 'fiber' herein).

In one form, a BSDS utilizes sensors on BSDS buoys to collect weather data.

In one form, a BSDS comprises one or more cameras for the detection of a variety of objects, conditions on the beach or in the water, and for security purposes. This includes but is not limited to detecting: people and other animals, water conditions such as rip currents, vessels such as boats or surfboards, and other dangers such as people engaged in illicit behaviors.

In one form, a BSDS comprises recording and storage devices to provide historical record of beach happenings and conditions.

In one form, a rules engine automatically activates a danger signal (i.e. red light) based on BSDS sensors and/or cameras on or overlooking the beach that sense dangerous conditions according to pre-stored algorithms.

In one form, a BSDS offers the option to purchase specialized software packages depending on a user's need. The specialized software can include but is not limited to software for detection of rip currents, oil spills, and beach erosion.

In one form, a BSDS includes specialized software for the detection of beach erosion for the capture of images of shoreline changes before and after a beach damaging storm or for the capture of beach changes over time. The images can be important in grant writing to gain funding for beach repair.

In one form, a BSDS comprises cameras for use in the detection of one or more of: smuggling, shoreline safety, and beach erosion changes.

In one form, a BSDS comprises lightning sensors which can activate a danger signal from the BSDS and can also alert other weather monitoring systems.

In one form, the lightning sensors of a BSDS can detect the proximity of lighting whereby the danger signal is activated if the lightning is within a prescribed distance of the beach.

In one form, a BSDS comprises a 911 help pushbutton pad that is positioned on a beach for activation by beach onlookers and lifeguards in times of emergency. The pushbutton sends an emergency message to 911, and automatically creates an incident report which may include one or more of: beach video, photos, time, weather reports, etc.

In one form, a BSDS utilizes AI (artificial intelligence) to process sensor data from beach days previously deemed dangerous to constantly improve recognition of dangerous beach conditions.

In one form, a BSDS recognizes when people are utilizing the water during conditions when the beach is considered unsafe and closed, and alerts law enforcement or other authorities who may arrive to ticket those not obeying beach safety.

In one form, a BSDS utilizes low light cameras to recognize when people are utilizing the beach at nighttime.

In one form, a BSDS utilizes shoreline cameras to track humans from the point of entering the water to leaving the water including tracking individuals swept away by rip currents or other situations such as drownings. This human tracking reduces search and rescue times and provides a significant savings of resources utilized for this purpose.

In one form, a BSDS includes WIFI for use by beachgoers as an added benefit to the BSDS thereby supporting enabled device use at the beach and supporting the work of remote learners and remote workers. In some embodiments, beach WIFI is utilized as an additional income stream for the beach owner.

In one form, beach peripherals include the devices that are connected to the public and private networks that extend from the BSDS. They are any device on the beach connected to the network that are both safety and non-safety related and include devices such as trash cans, meters, ZETs, LRNs, phones, etc.

In one form, WiFi extending from a BSDS lays the foundation to connect a variety of other smart devices including credit card terminals, vending machines, and smart trash cans.

In one form, BSDS specific beach peripherals can be connected by the BSDS's SRPN or LRPN depending on the distance from the nearest respective radio node.

In one form, BSDS devices and other public and private wirelessly connected devices utilizing the BSDS on the beach are considered a beach peripheral which can contain WLAN radios as well as other application specific low powered circuitry. Due to the nature of the soft ground at some beaches, direct conduit is not possible for some beach peripherals and thus, they require in most cases a standalone battery power source preferably configured with a solar charging system.

In one form, a beach peripheral used within a BSDS is a smart trash can with batteries as a base of the trash can. Other beach peripherals can include but are not limited to smart lifeguard towers, beach chairs, umbrellas, or canopies.

In one form, for bathroom or other concession facilities on firm ground, beach peripherals of a BSDS can include smart meters, POS terminals, kiosks, vending machines, advertisement TVs, and other connected devices.

In one form, a beach where electrical conduit is possible, a BSDS preferably utilizes a static power source such as from a local power company.

In one form, beach peripherals in a BSDS can include devices provided by the public such as cell phones, tablets, laptops, and other internet connected devices.

In one form, zone emergency towers can also function as a central command tower-central point where all the information comes in to and is then propagated to the outside world.

BRIEF DESCRIPTION OF THE VIEWS OF THE DRAWINGS

These and other features and advantages of the present invention will become more readily appreciated when considered in connection with the following detailed description and appended drawings, wherein each drawing is according to one or more embodiments shown and described herein, and wherein:

FIG. 1C depicts two frontal views of various embodiments of zone emergency towers with a closed smart container for holding a life ring therein;

FIG. 1D depicts a front view of a life ring node having a closed smart container for holding a life ring therein;

FIG. 1E depicts a front view of the life ring node of FIG. 1D with an open smart container exposing a life ring and emergency call box;

FIG. 1F depicts a cross-sectional view of the right ZET of FIG. 1C exposing various electronic components in the enclosure cavity;

FIG. 1G depicts a cross-sectional view of the life ring node of FIG. 1D exposing various electronic components in the enclosure cavity;

FIG. 2 depicts a front view of beach signage used in conjunction with a BSDS to help beachgoers interpret warning lights;

FIG. 3 is a legend depicting various types of communication and data transfer protocols that can be used in a BSDS;

FIG. 4 is a diagram depicting a variety of components which can be utilized in a zone emergency tower of a BSDS;

FIG. 11 is a diagram depicting a variety of components or modules that can be utilized in a life ring node;

FIG. 12A depicts a front view of a life ring node in an unactivated configuration;

FIG. 12B depicts a front view of a life ring node in an activated configuration;

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e. 100A, 100B, 100C). Elements labeled with numerals absent of letters (i.e. 100) refers to general elements that can be included in a BSDS. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Beach safety devices, systems and methods of their use according to this disclosure are abbreviated herein as BSDS.

Figure 1A:
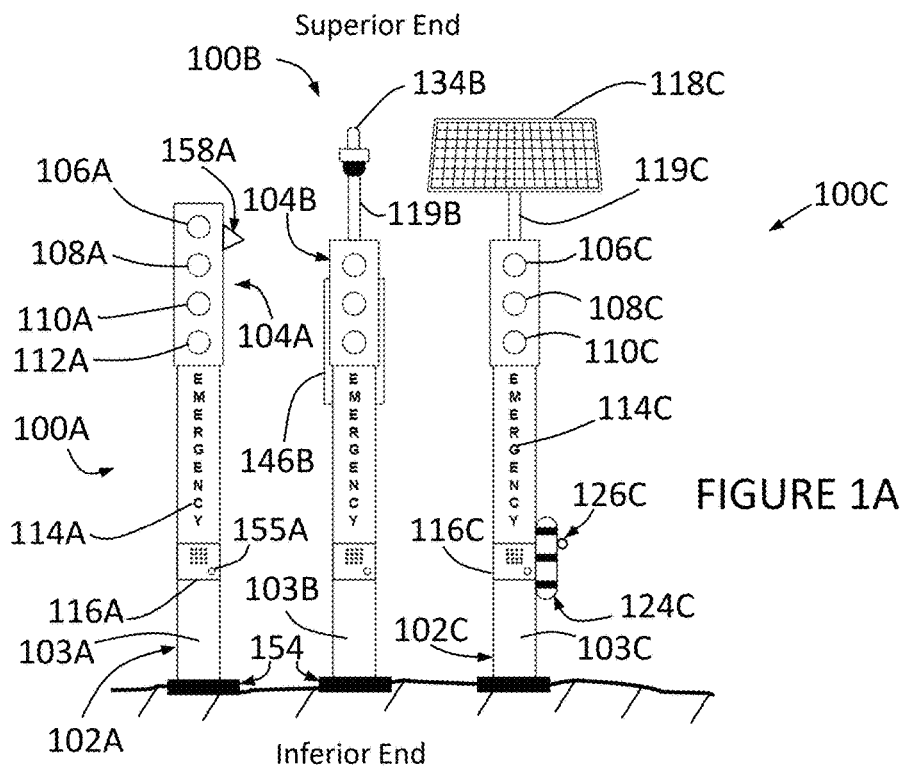
FIG. 1A depicts three frontal views of various embodiments of zone emergency towers.
Figure 1B:
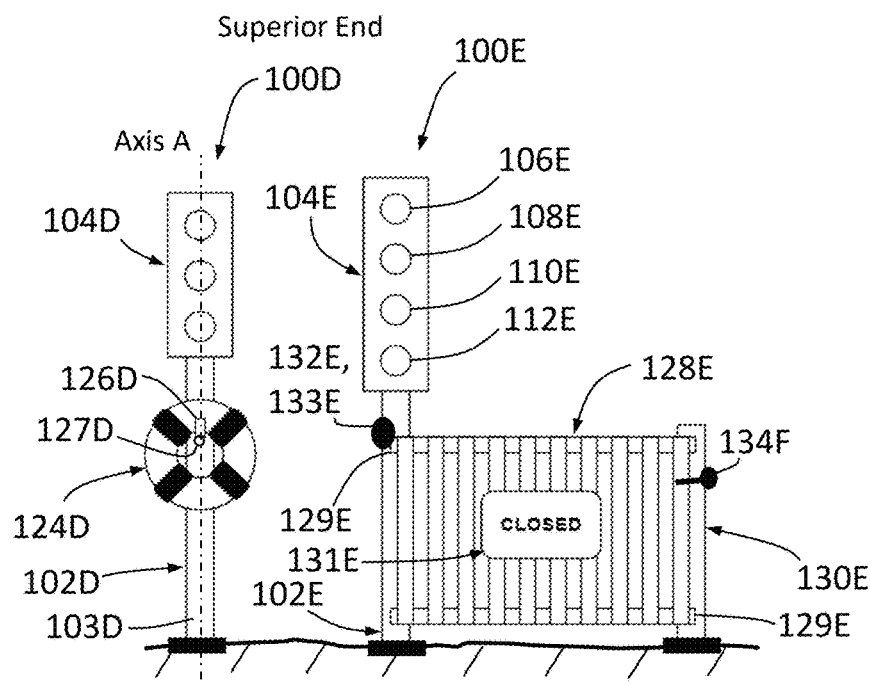
FIG. 1B depicts two frontal views of various embodiments of zone emergency towers.

One component of a BSDS is a zone emergency tower(s). Zone emergency towers (ZET) vary according to the limitations and needs of a particular beach, however, FIGS. 1A, 1B, and 1C illustrate several varying ZET embodiments in each Figure. The embodiments are not limited to those depicted in the Figures as features introduced on any of the depicted embodiments can be combined for alternative ZET designs under this disclosure. FIG. 1 is a zone emergency tower 100A comprising a tower enclosure 102A that is substantially upwardly elongate having an inferior end and a superior end and an internal tower cavity 107 defined by a tower enclosure inner surface 156 for housing at least some of the BSDS electronic components illustrated in FIG. 4. The inferior end is secured in or to the ground with ground fixation 154 using known methods such as bolting or set in a cement footing or using a helical pier. The ZET typically will include a voice box 116A mounted to the tower enclosure outer surface 103A that can be activated by pushing an activation button 155A on its face. One or more warning lights 104A are also secured to the ZET near a superior end. The warning lights can comprise a single light capable of changing a variety of colors, or can include a plurality of lights as illustrated here such as any combination of a red light 106A, a yellow light 108A, a green light 110A, and a purple light 112A. The ZETs described herein can also comprise a blue emergency beacon 105R, 105S, 105T (see FIG. 1C). The blue emergency beacon is a blue light that illuminates and preferably flashes when a callbox, emergency button, a smart container is opened, or a life ring latch is lifted. The blue emergency beacon flashes to alert both beach-goers and beach staff where and when an 'active emergency' is present and helps first responders get to the emergency location visually. The blue emergency beacon is separate from the other warning light colors which are used to indicate a level of risk. Emergency insignia 114A or other decals and instructions can be disposed on the tower enclosure outer surface 103A. This insignia can be as simple as the word 'EMERGENCY' or 'LIFERING' such as depicted in the embodiment in FIG. 1C.

The embodiment illustrated on the right in FIG. 1A includes similar components, however this ZET is equipped with a solar panel 118C secured to an accessory mount 119C which in turn is secured to enclosure outer surface 103C of tower enclosure 102C. The accessory mount can be in any variety of forms known in the art such as a tube, bracket, or bar to secure a variety of accessories such as a camera, sensors, or as already mentioned, a solar panel to the tower enclosure 102C. The accessory mount can also be used to shield conductors that travel from the accessory (I.e. solar panel) to electronics in the tower enclosure. In addition, this embodiment includes a life ring 124C that hangs from a life ring latch 126C that extends from tower enclosure 102C. The life ring latch can be equipped with a sensor (life ring latch detector) to trigger an emergency signal when the life ring is picked up. The ZET 100B embodiment illustrated in the middle of FIG. 1A also includes similar components as described earlier. This embodiment includes an IP camera 134B extending at a superior end of the ZET from accessory mount 119B. The IP camera can monitor and gather data related to for example, weather conditions, water conditions, and persons in and/or out of the water.

The embodiment depicted on the left in FIG. 1B is yet another embodiment of a ZET, which again comprises warning lights 104D, a tower enclosure 102D, and a life ring latch 126D extending from the tower enclosure outer surface 103D of tower enclosure 102D. In preferred embodiments, the tower enclosure is elongate and extends vertically along axis A in an operational configuration as shown here, however, the tower enclosure can assume other forms that vary from axially elongate but still maintain the same functional capabilities. A life ring 124D hangs for quick removal from life ring latch 126D which again can be equipped with a life ring latch detector 127D. On the right of FIG. 1B is an illustration of another embodiment of a ZET comprising a tower enclosure 102E, warning lights 104E nearer a superior end, and an automated gate 128E secured by one or more hinges 129E and/or gate actuator mechanism 133E using a gate motor controller 132E. The automated gate can pivot from tower enclosure 102E or from gate post 130E that is anchored in the ground. The front of automated gate 128E can include gate signage 131E to alert beachgoers for example that the beach is closed.

FIG. 1C depicts an alternative style of a zone emergency tower. The ZET 100R depicted on the left in the Figure comprises an elongate tower enclosure 102R having a tower enclosure outer surface 103R and a tower enclosure inner surface 156R defining a tower cavity 107R for housing of BSDS electronic components therein. The ZETs in FIG. 1C also comprise a smart container for housing a life ring 124R inside the smart container 163R. In preferred embodiments, the smart container is mounted to the tower enclosure outer surface 103R. As noted in the Figure, warning lights 104R are recessed in the tower enclosure outer surface 103R along with an emergency call box 116R. A blue emergency beacon 105R is utilized to indicate a present emergency. A solar panel for powering the ZET is placed superiorly extending from accessory mount 119R. In this embodiment, the ZET is secured to a mobile cart 157R capable of moving the ZET from one location to another on a beach, however, in most cases, ground fixation 154S is used to anchor the ZET in the ground as depicted in the right side embodiment of FIG. 1C. This embodiment includes an audio generator 113S such as speaker, alarm, siren, or buzzer to send out audio messages from the ZET. In some cases, the audio is generated in multiple directions with audio generators spaced about the circumference of the tower enclosure to better alert beach goers as illustrated here. An antenna 146S can be used to assist with wireless transmission. In some embodiments, an emergency call box 116S is disposed on the tower enclosure, whereas in other embodiments an emergency call box 116T is positioned within a smart container 163T such as depicted in the life ring node 123T of FIG. 1E. In this case, the step of opening the smart container precedes access to the call box. As further noted on the right in FIG. 1C, an IP camera 134S is mounted from accessory mount 119S that extends superiorly from tower enclosure 102R along with the zone flag 115S. The zone emergency towers (ZET) are used to divide the desired beach into segments or zones. A zone flag 115S can be extended from the ZET to help quickly identify an emergency location. As a result, the beach is equipped with various warning systems integrated in these segments that cooperate within the BSDS. In preferred embodiments, the zone emergency towers are the main conduit for spreading WLAN (i.e. WIFI) or WWAN (i.e. 5G antennas). The typical industry standard for beach flag zones are approximately 300-500 feet (90-150 meters), however, in practice the distance between these ZETs are only restricted by the maximum line-of-sight communication distance which is dependent on the type of communication protocol used.

FIG. 1F depicts a cross sectional view of the ZET depicted on the right in FIG. 1C thereby illustrating arrangement of electrical components contained within tower cavity 107T of the ZET. These components are also illustrated in FIG. 4 and discussed in further detail in the forthcoming paragraphs. In most cases, a WWAN gateway will be utilized as illustrated in FIG. 1F, however, other gateway protocols can be utilized depending on unique system configurations.

FIG. 1D depicts an embodiment of a life ring node 123T. The life ring node 123T has features in common with a ZET, however, it is absent of warning lights. The life ring node in this case comprises a smart container 163T (illustrated in a closed configuration) containing a life ring 124T stored inside. FIG. 1E is the same embodiment illustrated in an open configuration exposing the life ring 124T and in this case also an emergency call box 116T. In some embodiments, a life ring latch detector 127T activates an emergency signal such as blue emergency beacon 105T and/or sends an electronic message to emergency personnel alerting the need for help. FIG. 1G is a cross section view of the tower cavity 107T illustrating arrangement of some of the electrical components contained inside the life ring node. These components are also illustrated in FIG. 11 and will be discussed in further detail in the forthcoming paragraphs. Note in this embodiment, the life ring node comprises an IP camera 134T. In most cases, a WWAN gateway will be utilized as illustrated in FIG. 1G, however, other gateway protocols can be utilized depending on unique system configurations.

FIG. 2 depicts a front view of beach signage used in conjunction with a B SDS to help beachgoers interpret warning lights. The beach signage is either anchored to the ground or configured for mobile use. The signage will typically indicate that a red warning light indicates a 'high hazard', a yellow light for 'moderate hazard', and a green light for 'low hazard' beach conditions.

In some embodiments, zone emergency towers are configured with a WWAN gateway to directly connect with the SEC (system engine cloud), or a LRPN (long range private network) to connect to another BSDS device having a compatible radio. This can be useful when a zone tower is beyond the wireless reach of a WLAN/LAN/SRPN network or requires a standalone/backup channel. In this case, the standalone zone emergency towers are useful for remote entrances or other swimming spots away from the main beach. Adding a (W)WAN gateway to a ZET effectively makes the ZET a less intelligent CCT.

It should also be noted that sufficiently firm ground with conduit can be routed with CAT-6 or equivalent LAN/WAN infrastructure, or other SRPN/LRPN cabling, in the same conduit to establish the network backbone. Zone emergency towers located on soft sand can be set using helical piers as a support anchor. These emergency zone towers can be equipped with WLAN, namely WiFi, antennas or repeaters. Other embodiments achieve similar results using low range mmWave cellular antennas. Thus, the zone emergency towers contribute to establish public/private internet-based connectivity, or other wireless infrastructure across the designated beach.

Various embodiments of the BSDS can vary in part due to the types of available power. If commercial power is supplied from a local powerplant for example, this power can be used to power all or parts of the BSDS. However, if solar is the only source, choices in the BSDS are made more carefully due to limitations of the sun to keep BSDS batteries alive. In other embodiments, a beach is equipped with commercial power, but it may not have DSL or fiber optic hookup available. In such cases, cellular service can also be used in the BSDS, however, the cost is typically prohibitive.

In some embodiments of the BSDS utilizing LAN (an ethernet network that connects the zone emergency towers together), typically tubing and/or conduit piping is used that houses the ethernet line as well as the power line to connect the zone emergency towers together in a network like structure. In some embodiments, a wired private protocol can be serial, CANbus, or other similar protocols used with factory automation and cars. Greater volumes of data can be transferred when using a DSL or fiber optic line. Without these large volume data transfer protocols, the data exchanged in the BSDS is limited to the smaller volumes of data than can be wirelessly transferred through air to the cell tower and transferred back to the zone emergency tower typically at a much slower rate.

5G uses millimeter wavelength which is simply high frequency energy. When using higher frequency devices, these devices communicating in the BSDS need to be closer to user equipment just like cell phones need rather close proximity to 5G towers. Therefore, in embodiments utilizing 5G, more antennas are needed with the benefit of greater volumes of data being transferred quickly.

In most cases, the zone emergency towers do more than just divide the beach, they can also: give sufficient network coverage on the beach (i.e. cellular WIFI, LAN, WAN etc.), provide emergency assistance and/or floatation approximately every 300 feet to minimize travel for an individual seeking help and lacking a phone, and provide a light for the sake of safety in darkness. In some embodiments, the ZET has a camera and images from the camera can be transmitted to personnel that can assess help needed at least partially based on images from the camera.

In some embodiments, hardwire is unavailable between the ZETs and therefore the ZETs are located in close enough proximity to communicate wirelessly and in some cases create a wireless communication chain. In preferred embodiments, each zone emergency tower is reliant on the central command tower whereby data from the ZETs is consolidated and communicated as needed to the outside world.

FIG. 3 is a legend providing a graphic representation of various types of communication and data transfer protocols that can be used in the BSDS. FIG. 4 depicts one embodiment of the cooperation between electrical components in a zone emergency tower. The zone emergency towers can have any combination of: a warning light 104, an audio generator 113, an emergency call box 116, emergency button 140, a life ring latch 126 which in some embodiments has a life ring latch detector 127 (triggering a signal when the life ring is picked up), a VOIP emergency phone 218, a life ring 124, and any other feature that can trigger an emergency when used. The emergency call box 116 can assume a variety of forms such as for example a simple button like a fire alarm that can contain internal lights, a buzzer etc. In some embodiments, the emergency call box 116 is in the form of a VOIP two-way emergency phone 218 that is connected to help upon a button press.

In alternative embodiments, a cellular modem is disposed on a life ring or on the individual zone emergency tower and configured to connect directly to the system engine cloud 200. The zone emergency tower can assume a variety of forms that vary from those illustrated in FIGS. 1A, 1B and 1C. The ZETs can be for example in the form of a small post, a gate, or a building. Automated gates (I.e. 128E in FIG. 1B) having a gate motor controller 132 are useful to control people traffic by discouraging beach users during unsafe conditions. ZETS in preferred embodiments are equipped with outdoor lighting (I.e. 158A) and are therefore useful for spreading light across an otherwise dark beach at night. In addition, the ZETs are the conduit for energy along the beach. In this respect, the zone emergency towers perform a multitude of functions including safety and connectivity on the beach.

Figure 19:
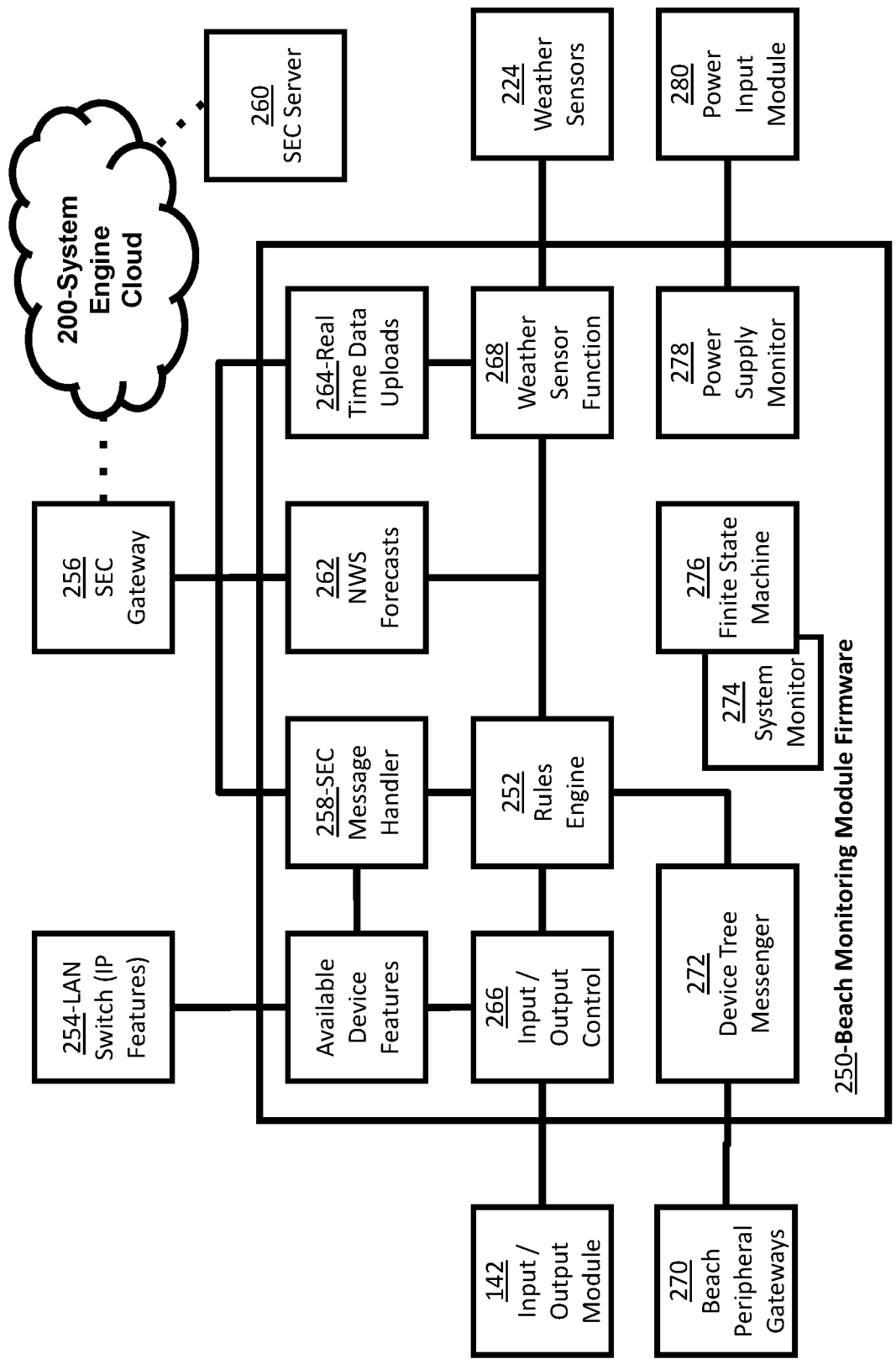
FIG. 19 is a graphical depiction of the firmware operation utilized in a beach safety system.
Figure 20:
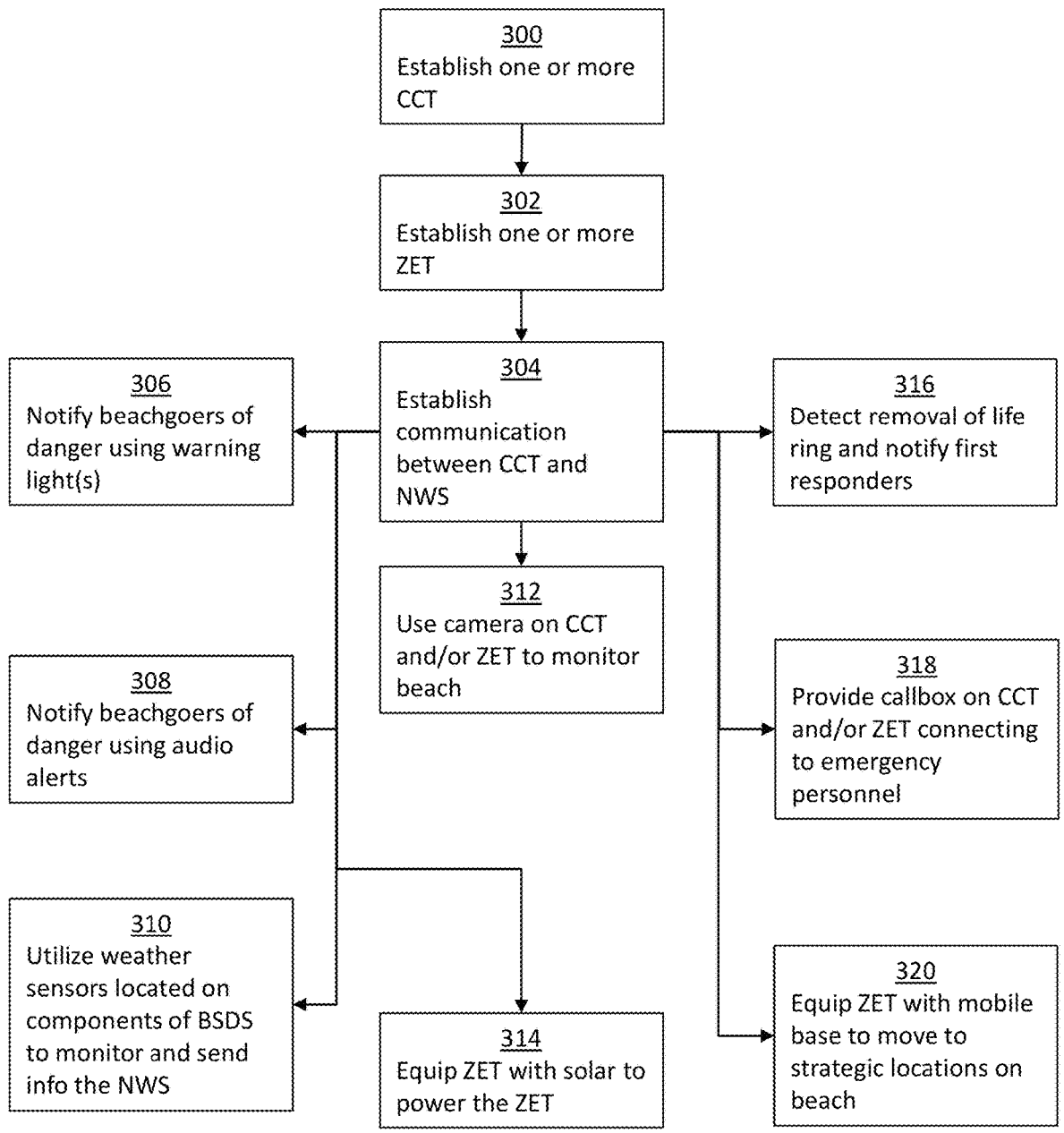
FIG. 20 is a graphical depiction of a method of utilizing a BSDS on a beach.

A main purpose of zone emergency towers 100 is to provide visual and/or audible warning, and a method of emergency issuance, in the event of dangerous swimming conditions. In preferred embodiments, the ZETs contain a beach warning light(s) 104. The beach warning lights are driven by an input/output module 142 which comprises one or more of actuated switching elements such as relays, transistors, optical switches, and other switching devices. In some embodiments, the ZET comprises an IP camera 134 and a power input module, batteries 138 to control power to the ZET. The input/output module 142 is connected to a control module 136 which comprises a CPU (central processing unit) 149 and contains the device's beach monitoring module firmware 250 (FIG. 19). The ZET may also house the various gateways/access points radios or other modules internally as illustrated in FIG. 4 or communicate through other wired protocol (i.e. a control module with the I/O module built in the same package).

The ZET 100 can be configured with any variety of communication types depending on the desired application. A LAN gateway 202 will tie the device to the IP network through hardware. The WLAN gateway 204,205 can either couple the device to the rest of the network or act as an access point for user equipment and other beach peripherals. A WAN/WWAN gateway 206, 207, 208 would tie the zone emergency tower 100 directly to the SEC 200 or supply 5G mmWave 232 coverage. The WAN/WWAN gateway 206, 207,208 would effectively convert the zone emergency tower 100 into a simpler/less intelligent CCT (central command tower). In some embodiments, use of a LRPN 212 or SRPN 210 (i.e. long range private network, short range private network) gateway ties the zone tower to a specific communication channel of the BSDS depending on the ZET's distance from the rest of the network.

In some embodiments, the ZET's are additionally equipped with an audio generator 113 to alert beach goers using sound consequently providing an additional sensory method. The audio generator 113 can be in the form of speakers, buzzers, beepers as well as preprogrammed or dynamic VOIP output. Again, the ZET's can be of any shape or structure, or built into or mounted on a structure such as for example built into a lifeguard tower, a nearby building, or entrance to a marina boat dock. All that is required is sufficient waterproof space for the required electronic equipment.

In some embodiments, a zone emergency tower 100 is configured to a shape similar to traditional blue light towers (FIG. 1C). They are preferably metal structure (although other materials such as polymers can be used), typically rectangular (but can be of other profiles such as round) and are typically 9 feet or greater in height. The towers depicted in FIGS. 1A-1C are preferably painted a bright color: blue, white, yellow, or orange in order to attract attention and when the light is activated it is used for emergency situations to alert local authorities. As previously stated, the ZET can comprise any combination of an emergency call box, button, latch, a LED dome light (outdoor lighting) for visibility, IP cameras, buzzers, alarms, and solar panels for charging a battery used as a power source.

In other embodiments, a ZET is in the form of a small post, and in other embodiments is a post mounted to an existing structure (pier posts, flag poles, building walls such as bathroom facility, etc.). The ZETs can have a VOIP emergency phone 218 connected to a LAN gateway 202 or an emergency button 140 that when depressed alerts emergency personnel attached to the input module to allow for on-site accessible emergency assistance. In some embodiments, the ZETs are equipped with a gate motor controller 132 to activate one or more automated gates 128 which control the flow of beach traffic by opening or restricting points of entry. The automated gate 128 paired with the warning lights 104 can send explicit messages to passersby that the beach is closed to the public. Also, life ring latches 126 with sensors active to the removal of the life ring (or any other detection sensor) can be added which, when tripped, set off the active-emergency alarm signal.

Figure 5:
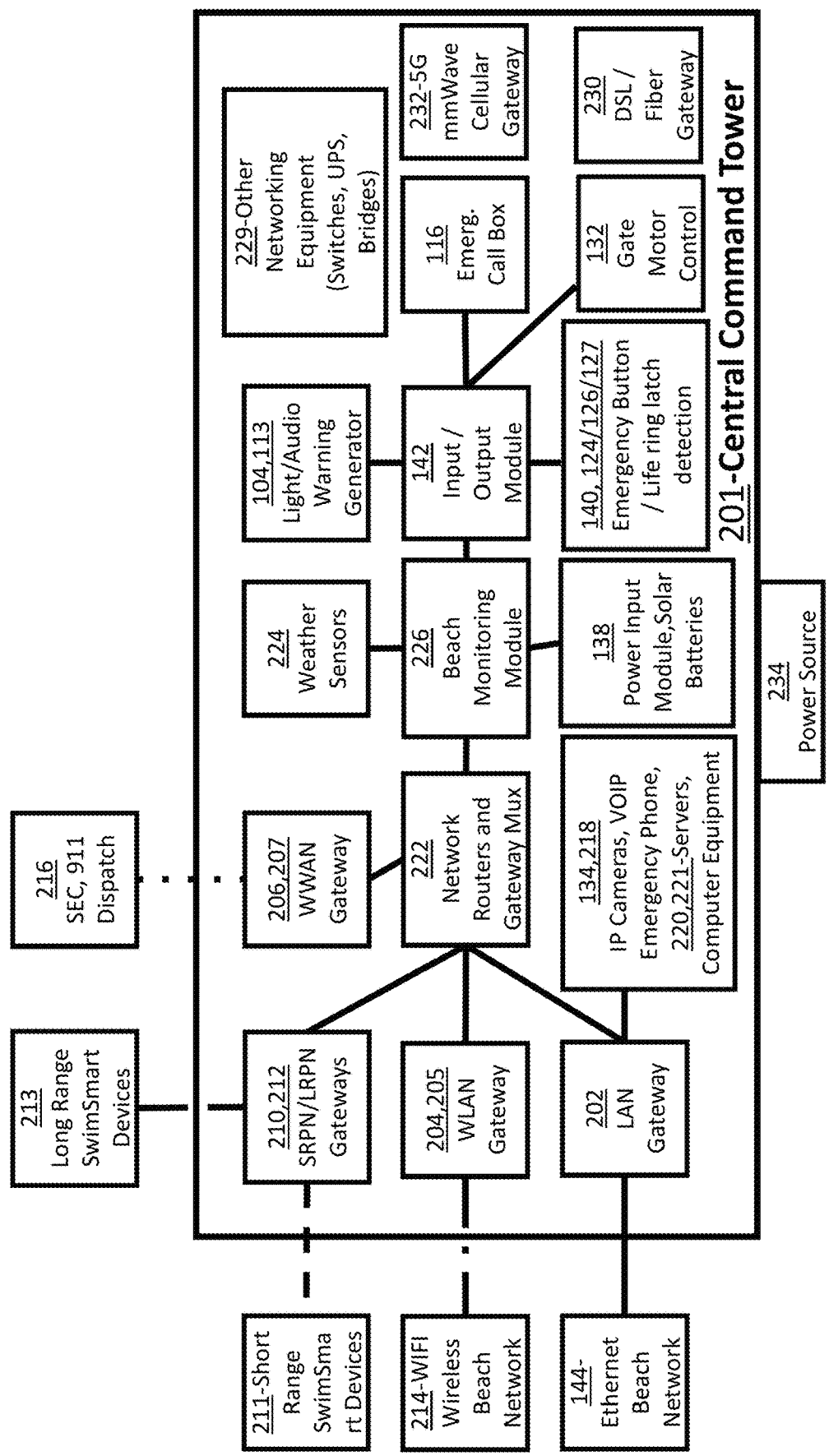
FIG. 5 is a diagram depicting a variety of components which can be utilized in a central command tower of a BSDS.

Central Command Tower (CCT):

FIG. 5 is a flow diagram depicting a variety of components that can be utilized in a central command tower 201. In preferred embodiments, the central command tower 201 contains the bulk of the networking equipment and other high-powered electronics attached to the input/output module. The central command tower 201 can be any structure or building that is sufficiently powered and has adequate space for the equipment housed within it. In preferred embodiments, the CCT receives hardwired power from a commercial power source 234 whereas the ZETs in most cases receive power from sources such as a solar panel. In one example embodiment, a central command tower 201 is in the form of a small closet in a bathroom facility, whereas in other embodiments, the CCT is in the form of a lifeguard shack, a utility building, or a standalone bluelight tower shape like previously presented zone towers. It should be noted that a BSDS 90 is not limited to having one single central command tower, in such cases, additional central command towers in a BSDS will subdivide the incoming data signals thereby increasing throughput in the BSDS. If so equipped with the necessary peripherals, a CCT 201 can perform functions otherwise delegated to a zone emergency tower 100 such as producing light and audible warnings via warning lights 104 and audio generators 113 (i.e. speakers, buzzers). Other functions can include an IP camera 134 to monitor the beach and shore, VOIP emergency phone 218, a life ring 124 on life ring latch 126 with life ring latch detector 127, a gate motor controller 132 to control automated gates, weather sensors 224, emergency buttons 140, and emergency call boxes 116 etc.

The central command towers 201 are utilized to consolidate information from the various peripheral beach devices (I.e. ZET, LRN, buoys, etc.) and make intelligent decisions regarding beach safety. Thus, the central command tower requires sufficient communication channels to reach every peripheral beach device, or intermediary device. An intermediary device refers to a gateway device that converts from one communication channel to another. So, in the event a CCT does not have a SRPN radio for example, another device that is connected to the CCT may have it and be utilized. Thus, if the CCT has another zone emergency tower down the beach (connected by WiFi) and this other ZET has a SRPN radio, that zone emergency tower acts as an intermediary device between the CCT and the SRPN network. Therefore, the CCT can communicate to the SRPN through the ZET.

The central command towers also act as the centralized WAN 208, public WWAN 206, and private WWAN 207 system access point from the outside world. The central command towers 201 contain the network routers and gateway mux 222. A gateway mux works as a switch for signals and is a consolidation point of the variety of device traffic which funnels data to various gateways interacting with the other peripheral devices. In other words, the gateway mux functions to funnel multiple signals to a single point. Network routers operate as the 'mail carrier' for the beach network. The routers have a map of the various electronic 'addresses' for the devices on the beach and can facilitate message traffic therein. For embodiments where the central command towers 201 have a power source 234 such as from a local power grid, conserving energy is not of concern as it is with standalone battery powered systems. Thus, grid powered systems can extend many different features without concerns over battery life. A CCT 201 can therefore utilize a power input module 138 to control use and distribution of power received from an external power source 234 or from internal batteries in the CCT that remain charged through alternative means such as solar panels and wind turbines. As previously discussed, zone emergency towers 100, life rings nodes 123, smart trash cans, and buoy nodes (such as modular buoy node 160) can also be connected to the central command tower 201 such that information gathered from the beach is communicated back to a central command tower 201. As further illustrated in FIG. 5, the CCT will include at least one form of networking equipment for consolidating this information into one form such as one or more of SRPN/LRPN gateways 210/212 (operable for communication and/or control of complementary short range BSDS devices 211 and/or long range BSDS devices 213, also termed SwimSmart™ devices), WLAN gateway 204/205 (operable with WIFI wireless beach network 214), LAN gateway 202 (operable with ethernet beach network 144), and WWAN gateway 206/207 (which can be used to connect to the SEC 216 to reach 9-1-1 dispatch). Network routers and gateway mux 222 route the information to the outside world preferably via a DSL or fiber optic gateway 230. A cellular connected WWAN gateway that is directly connected though the system engine cloud 200 can be utilized as a back-up. The CCT can include other networking equipment 229 such as switches, bridges, and an uninterruptible power supply. The CCT can also include a 5G mmWave cellular gateway.

A beach monitoring module 226 serves as the brain of the BSDS 90. The BMM 226 monitors, communicates with, and diagnoses issues with all safety-related beach peripherals (ZETs, LRNs, MBNs, etc.). The BMM also houses the Rules Engine 252 which is the preprogrammed set of rules that determines how the safety system functions based on various factors. The BMM is the primary connection handler of the BSDS with the SEC 200. While other DCE devices can communicate with the SEC it is the BMM that formats the data into one large 'beach status report' data stream for the SEC. The BMM 226 is also what handles and can trigger emergency signals and propagate them to all the beach peripherals and the SEC 200.

Weather sensors 224 sense the ambient weather conditions and provide this data to the beach monitoring module 226 in the CCT 201. If for example, lightening is sensed, the warning lights 104 can be activated thus illuminating a red light 106 or sounding a beach alarm. Along the beach up to three different types of networks can be utilized (LAN 202, WLAN 204/205, SRPN/LRPN 210/212) whereas when connecting via the WAN/WWAN gateway 206/207/208, to the system engine cloud 200, the BSDS operates as a single network.

Input/output module 142 in the CCT comprises one or more of actuated switching elements such as relays, transistors, optical switches, and other switching devices. The input/output module 142 in some embodiments is connected to a BMM 226 which comprises a CPU (central processing unit) that holds the device's application firmware.

Figure 6:
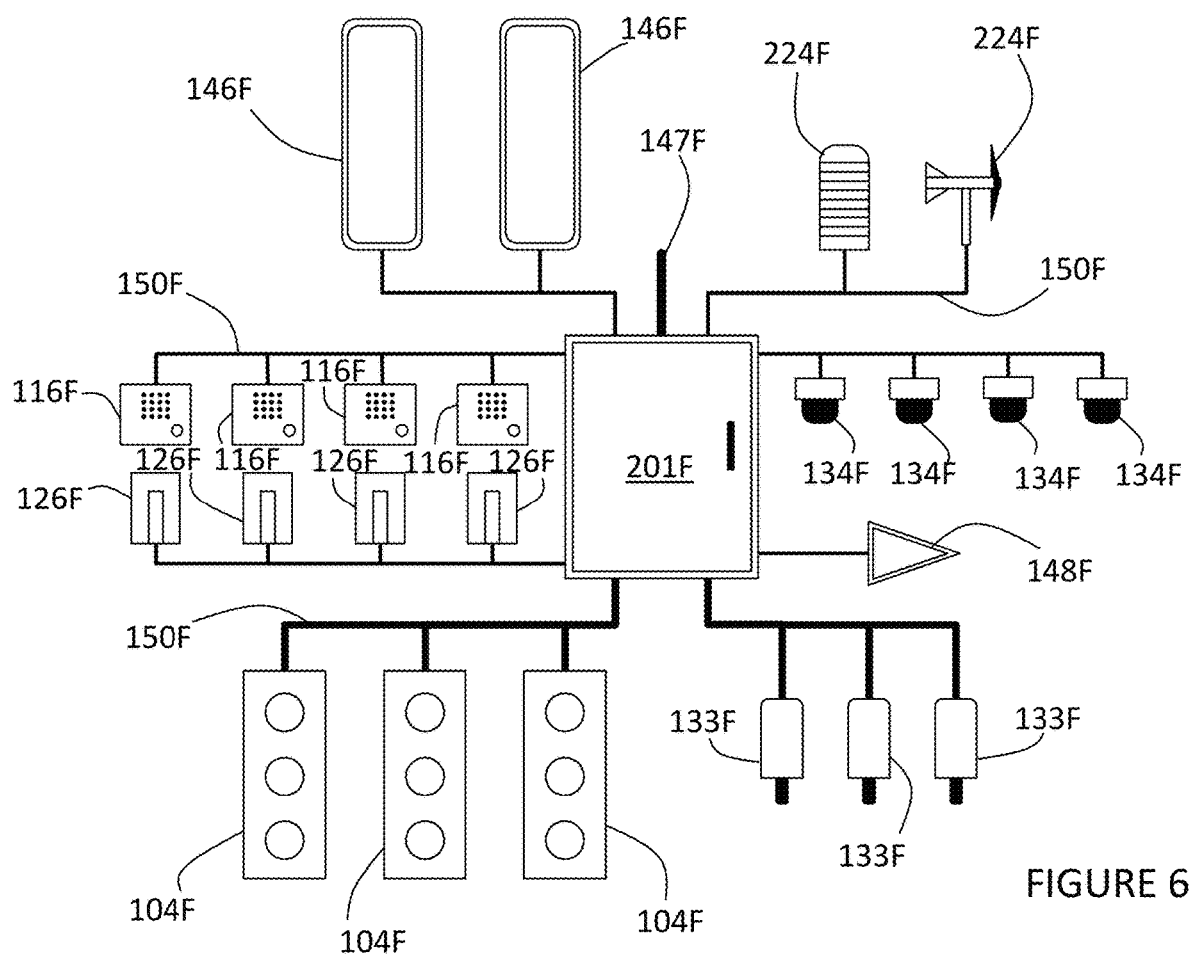
FIG. 6 is a diagram depicting a variety of components which can be utilized in a Central Command Tower of a BSDS.

FIG. 6 illustrates one embodiment of a CCT 201F and the connectivity between the various peripheral devices in an ethernet type of setup. Many peripheral devices (IP cameras 134F, weather sensors 224F, emergency buttons (not shown), emergency call boxes 116F, warning lights 104F, life ring latches 126F with life ring latch detectors 127F, gate motors 133F, LRPN and SRPN antennas 148F, etc) can be strung together in a network-like structure originating from the central command tower 201F. In some embodiments, one or more of the various BSDS peripheral devices illustrated here can be mounted to or extend directly from the CCT 201F with duplicate peripheral devices located away from the CCT at locations along the beach such at a zone emergency tower. In FIG. 6, the black lines extending between the peripheral devices and the central command tower 201F represents hardwire 150F extending therebetween whether the peripheral is at the CCT or located away at a ZET for example. As further illustrated in FIG. 6, a CCT 201F can utilize one or more antennas 146F corresponding to the communication protocol utilized (i.e. large WIFI or 5G antenna or other) to spread connectivity on the beach (I.e. cellular antenna 147F). In this embodiment, weather sensors 224F are mounted to the CCT 201F since the CCT is at the heart of the network. The weather sensors 224F are illustrated here as a wind speed and wind direction vane (on right), or a global weather sensor (on left) that includes multiple weather related sensors in one unit (i.e. humidity, temperature, wind speed, wind direction etc.). In some embodiments, the weather sensors are located away from the CCT such as for example, disposed on a buoy or a nearby pier. The CCT 201F is the site of collection for the information from these peripherals (i.e., weather sensory data, IP cameras, emergency call box) and is also the site from which signals are sent to activate a peripheral (i.e., warning lights). The CCT can then communicate data and other information via the likes of DSL or fiber optic to emergency personal, weather stations, or others as needed. A cellular antenna 147F, can be included to utilize cellular networks as a backup in the event of failure of other networks.

Modular Buoy Node 160

Figure 7:
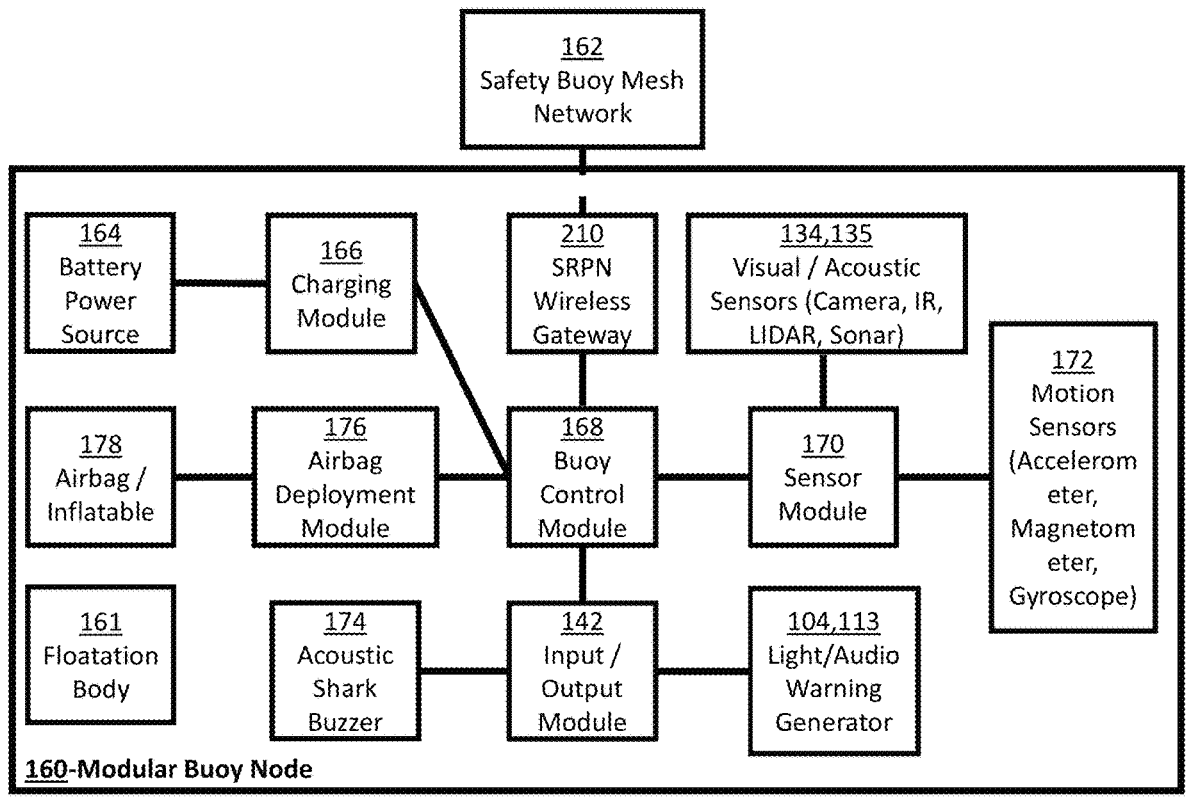
FIG. 7 is a diagram depicting a variety of components that can be utilized in a modular buoy node.

FIG. 7 is a flow diagram depicting a variety of components that can be comprised in a modular buoy node 160 (MBN). A modular buoy node 160 is a modular connected buoy that is capable of performing a variety of functions depending on its integrated features. Due to the advanced capabilities of the MBN, the MBN can be referred to as a smart buoy. The MBN's size is dependent to some degree on the amount of electronics and associated batteries enclosed in the buoy. MBN's with less features will be smaller in size. The MBNs are used to outline a designated swimming perimeter much like how traditionally buoys are used. Some buoys in the swimming perimeter can be regular (non-smart) buoys to maintain a sufficiently tight perimeter. The smart buoys such as the MBNs, however, are part of and connected to the BSDS. The 'chain' of buoys in a BSDS swim area can be as sparse as a single MBN with remaining buoys of a traditional buoy form to a full arsenal of MBNs lining the perimeter of a swim area.

All of the buoys described herein comprise a floatation body 161 that can assume a variety of forms that those skilled in the art will recognize a providing floatation such as an inner enclosed chamber or manufactured from floatable materials such as a foam. The floatation body 161 is of sufficient strength to not only withstand the forces of the body of water in which it resides, but also the other outdoor elements such as sun, wind, hail, and sometimes ice. An MBN can contain one or more sensors to measure various wave conditions and hydrodynamic phenomena and report this information to a sensor module 170 on the MBN. In FIG. 7 for example, the MBN 160 can comprise motion sensors 172 in the form of for example one or more of accelerometers, magnetometers, and gyroscopes. With this feature, a parallel string of smart buoys can work together to measure wave dynamics and report the findings back to the associated central command tower 201. Machine learning and artificial intelligence software packages can be applied in unison with other devices to detect rip, structural, outlet, or other dangerous currents in near-real time. In some embodiments, an MBN buoy contains various visual sensors or voice sensors and transducers such as an IP camera 134, IR, LIDAR, sonar, acoustic sensors 135 (i.e., voice sensor) etc. The MBN in preferred embodiments comprises a battery power source 164 to provide power to run the various functions on the buoy and communicate within the safety buoy mesh network 162 through a SRPN wireless gateway 210. A buoy control module 168 controls the actions of the various features on the MBN based on input received through the SRPN wireless gateway 210 or from the sensor module 170. For example, the buoy control module 168 can activate a charging module 166 that utilizes solar or wind energy or hardwired power to charge the battery power source 164. The buoy control module 168 can control an airbag deployment module 176 causing it to activate an inflatable airbag 178 that a distressed swimmer can utilize to stay afloat. Likewise, the buoy control module 168 through communication with an input/output module 142, can activate an acoustic shark buzzer 174 causing consequent movement of sharks away from the swimming area. Similarly, the buoy control module 168 through communication with an input/output module 142, can produce a warning through activation of a warning light 104 and/or activation of an audio generator 113 (I.e., speakers, buzzer) alerting swimmers of dangerous conditions by means of light and/or sound. In some embodiments, the warning lights and the audio generators produce light and sound in a multitude of directions. For example, in FIG. 1C, zone emergency tower 100S utilizes a plurality of audio generators 113S such as speakers that encircle tower enclosure 102S.

Figure 8A:
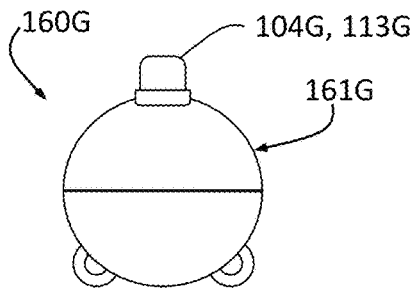
FIG. 8A depicts a front view of a modular buoy node.
Figure 8B:
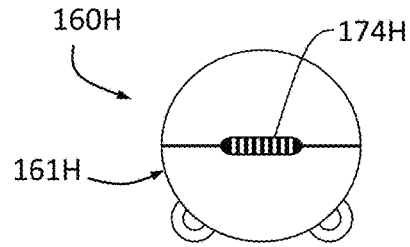
FIG. 8B depicts a front view of a modular buoy node with an acoustic shark buzzer.

FIG. 8A illustrates one embodiment of a modular buoy node (MBN) 160G. In this embodiment, the MBN has a warning light 104G on top and/or an audio generator 113G such as a speaker to signal information by light color or audio warning to people on the beach (i.e., danger, stay out of the water or get out of the water). Alternatively, or additionally, the MBN can include an acoustic sensor 135 such as a voice sensor that recognizes a swimmer's verbal distress. As illustrated in FIG. 8B, the MBN includes an acoustic shark buzzer 174H operable to scare away marine life such as sharks and stingrays from the swimming area working much like a dog whistle to deter aggressiveness in dogs. The MBNs can be powered by a battery power source 164 or tied to the grid by underwater hardwired power. Most embodiments of the MBNs are situated at least partially underwater and therefore running a 120V power source is typically not desirable. Sonar can be used to detect various marine life or detect migrating underwater channels which are the foundation for, and byproduct of, rip current formation. The onboard intelligence can detect these and other hazards and perform risk assessments and send metadata back to the central command tower.

Figure 8C:
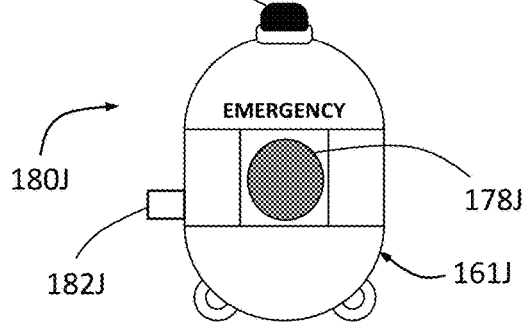
FIG. 8C depicts a front view of a modular buoy node with airbag operable to release an airbag flotation device.

FIG. 8C depicts one embodiment of an airbag buoy 180J operable to release an airbag flotation device 178J by self-actuating airbag pull lever 182J or by remote actuation by emergency personnel such as a lifeguard. IP camera(s) 134 providing visual sensor data or acoustic sensor(s) 135 providing sound data in conjunction with machine learning is utilized in some embodiments to assess a swimmer's level of danger and then actuate the airbag flotation if so warranted. Alternatively, the airbag can be discharged by a user of the BSDS with the relevant permissions. In one embodiment, an airbag buoy is as simple as a traditional soft buoy that is buoyant enough to hold a swimmer's head above water. Sensors can be utilized to detect when the buoy is forcibly pushed downward indicating a sign of potential struggle. In some embodiments, motion sensors are used to detect wave height and wave period and other fluid dynamics. In preferred embodiments, the airbag buoy is a form of a MBN 160. It can comprise an input/output module 142 such as a relay/transistor that turns these other modules present in the buoy on and off (i.e., lights, buzzer, acoustic warning etc.). In preferred forms, the airbag buoy comprises a SRPN wireless gateway 210 as a means to communicate with the outside world. The SRPN is a private network that can be dedicated to the buoys and is higher powered and more reliable and less likely interrupted by unwanted noise compared to other networks protocols such as WIFI. In an alternative embodiment, an airbag buoy 180 may comprise a rotating firing mechanism that discharges a soft flotation device in the vicinity of the struggling swimmer. In another alternative form, deployment of the airbag buoy results in expansion of the buoy in a single direction.

Figure 9:
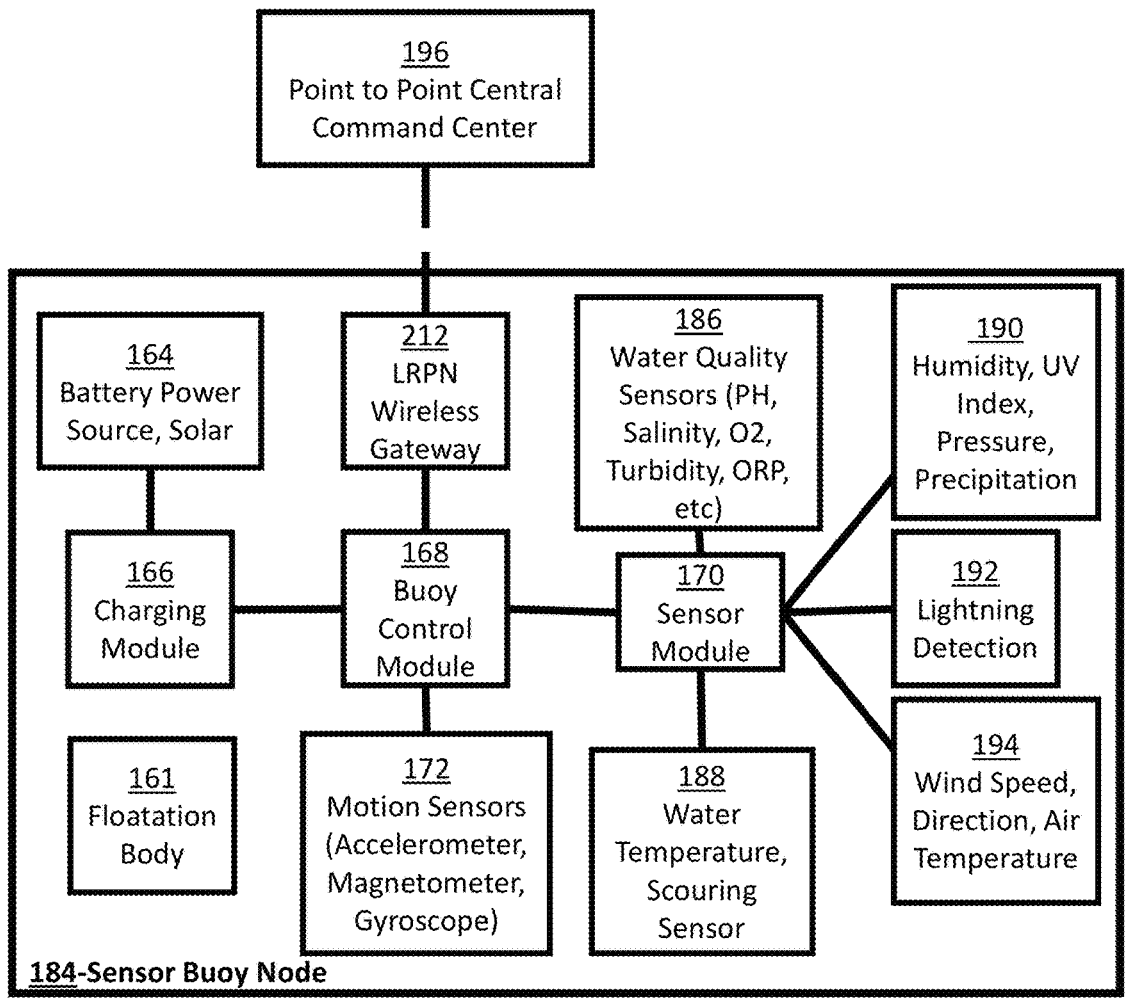
FIG. 9 is a diagram depicting a variety of components or modules that can be utilized in a sensor buoy node.
Figure 10:
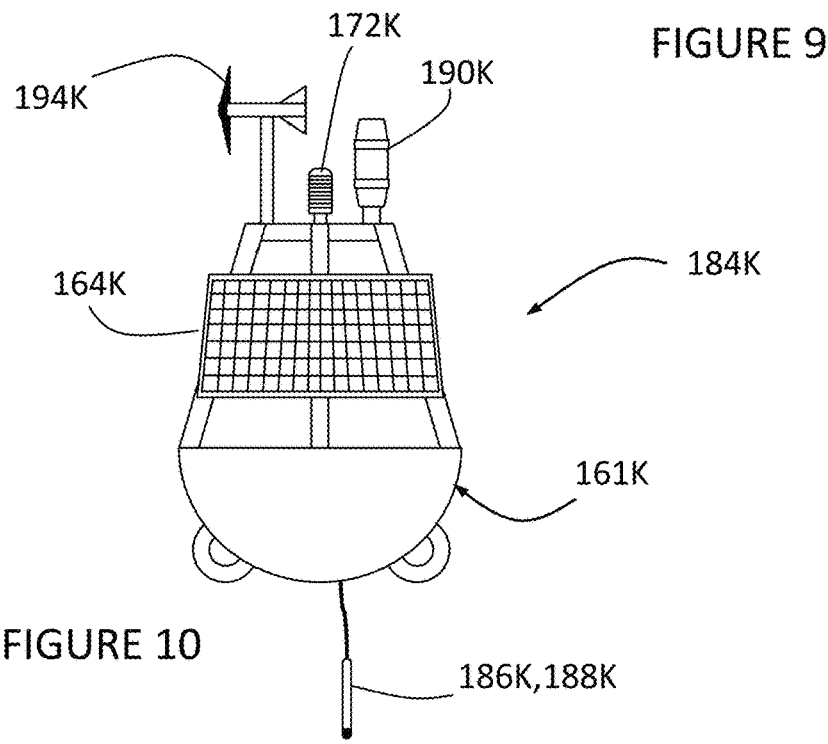
FIG. 10 is a front view of a sensor buoy node.

Sensor Buoy Node 184:

FIG. 9 is a flow diagram depicting a variety of components or modules that can be utilized in a sensor buoy node 184. The sensor buoy node 184 is used to collect meteorological data further offshore (relative to other buoys in the BSDS) while remaining in contact with the BSDS. Due to this further distance, in preferred embodiments a LRPN wireless gateway 212 is utilized to communicate with the central control tower although an SRPN can be used as an alternative. Given its location further off the beach and its sensors, the sensor buoy node 184 is well equipped to perform forecasting and risk assessments. In preferred embodiments, a sensor buoy node has one or more of the sensors described previously with other buoys including motion sensors 172 to measure various wave dynamics. The sensor buoy node 184 includes one or more additional sensors that can be used for measuring traditional meteorological parameters. One example is a humidity, UV index, pressure, and precipitation sensor 190. Another is a wind speed, direction, and air temperature sensor 194. A lightning detection sensor 192 can also be utilized to perform risk assessment related to lightning strikes. Water temperature and scouring sensors (to detect water levels) 188 and water quality sensors 186 (to measure Ph, salinity, O2, turbidity, ORP, etc.) can also be included in the sensor buoy node. Finally, other specialized sensors to measure harmful contaminants such as *E-coli* and other bacteria along with HABs (harmful algal blooms) are utilized in some embodiments of sensor buoy nodes. Sensor buoy nodes measuring contamination are well adapted for use at water outlets from natural rivers and streams as well as industrial discharge near the beach of interest. Some beaches rarely experience current or structure related incidents, however, they can be faced with water contamination poisoning concerns. Sensor buoy nodes are a useful tool in ensuring the efficacy of the beach safety system. FIG. 10 depicts one embodiment of a sensor buoy node 184.

Again, the various smart buoys described herein are preferably powered by a battery power source 164. A charging module 166 on the buoys can obtain energy from a variety of sources such one or more of a: motion generator, solar panel, wind turbine, and various other energy producing device known in the art. In most embodiments of the buoys, a buoy control module 168 communicates with a network router and gateway mux 222 and computer at the central command tower 201. The buoy control module includes the code utilized to process sensor data and provide instructions to other actionable modules.

Life Ring Node 123:

FIG. 11 is a flow diagram depicting a variety of components or modules that can be utilized in a life ring node 123. The life ring node 123 comprises a smart container 163 that holds a life ring 124 therein. In some embodiments, the smart container will comprise a smart container heater 165 to assure the smart container reliably opens even in freezing conditions. Other common features noted in the FIG. 11 life ring node have been described in previous descriptions. In some forms, a post, a smart trash can or other structure or device is utilized to support the life ring node that the life ring hangs on. The life ring node commonly is seated on posts on the pier and dangles off the edge of the pier.

In one embodiment, the life ring 124 itself is a smart device with a computer embedded in the body of the life ring and termed here as a smart life ring. Similar to a chain of smart buoys, a chain of smart life rings can form a line either down a pier or parallel to the water on a boardwalk or other structure. The life ring node 123 can be equipped with WLAN repeaters if the structure is of permissible size and has sufficient grid power.

The smart containers 163 containing the life ring 124 can have a life ring latch detector 127 module that detects when the smart container 163 is opened as a user attempts to utilize the life ring 124. In a simpler form, a life ring node 123 comprises a life ring 124 that has an integrated sensor that is activated when handled thereby operating as an alternate to life ring latch detection. The life ring itself with embedded sensors such as motion sensors 172 can detect when the life ring 124 is thrown and bouncing in the water. In various embodiments, the life ring node 123 includes some or all the modules illustrated in FIG. 11 and previously described. For example, in some embodiments, the life ring node 123 comprises a battery power source 234, batteries 164, and charging module 166. In very harsh wave conditions as part of the motion sensors 172, a GPS can assist search and rescue crews locate a stranded swimmer lucky enough to secure to a life ring. Water temperature/scouring sensors 188 could also be used to determine the response time given to first responders before the onset of hypothermia or death.

FIG. 12A illustrates one embodiment of a life ring node 123L in an unactivated (closed) configuration whereby the life ring 124L is contained inside a life ring cavity 137L of smart container 163L, whereas FIG. 12B represents a life ring node 123L in an activated (open) configuration whereas the cover of the smart container 163L has been opened, the life ring latch detector 127L activated, and life ring 124L removed. Opening the life ring smart container 163L is synonymous for the BSDS to pulling a fire alarm. If so equipped, the smart container 163L can also have warning lights 104 that flash in the event of a high risk situation or flash in the event of the life ring being used. A water temp and scouring sensor 188 can be attached to life ring posts or positioned on the smart container 163 that are near the edge of a boardwalk or pier. The scouring sensor determines the depth of the water which, as a result of erosion and many other factors, changes over time. This scouring sensor is useful for predictive maintenance of various coastal structures to sense erosion occurring under a pier or break wall as waves crash under it causing erosion underneath. This useful tool saves money in detecting damage due to erosion after storms. Sensors and other camera data can be used to write grants to gain money to reconstruct eroded beach fronts.

Figure 13:
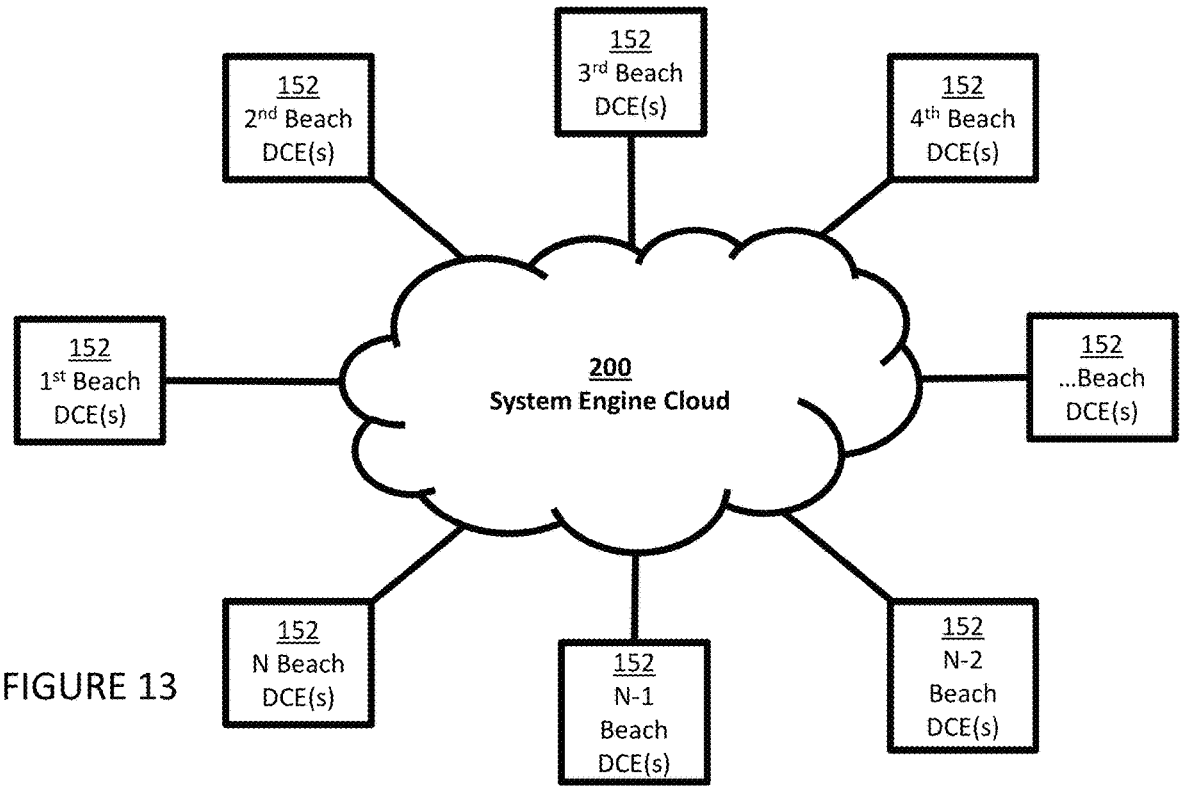
FIG. 13 depicts a graphical view of a system engine cloud utilized with a beach safety system.

FIG. 13 depicts a preferred relationship of a system engine cloud (SEC) utilized with a BSDS. A single BSDS can be utilized to manage beach safety at a single beach or a plurality of beaches. When operating for the benefit of a plurality of beaches, the SEC 200 connects all of the beaches together allowing them to be managed under a single platform. This provides for eased access of each of the individual devices on a given beach. A single beach may have more than one DCE (directly cloud enabled) device 152 whereas other applications may require only a single DCE device such as a beach with only one life ring node and nothing else. In such situations, having an entire CCT 201 as a consolidating communication point is impractical. Therefore, making a life ring 124 a DCE (directly cloud enabled) device is a practical solution. The number of configurations of DCE's are innumerable. DCE's can also act as a point of entry for the rest of the network, especially so for the case of the CCT. The DCE device allows commands, software, signals, or other information to flow between the SEC and the local beach network. This top-down approach allows for important system monitoring and software upgrades to be performed from any location.

Figure 14:
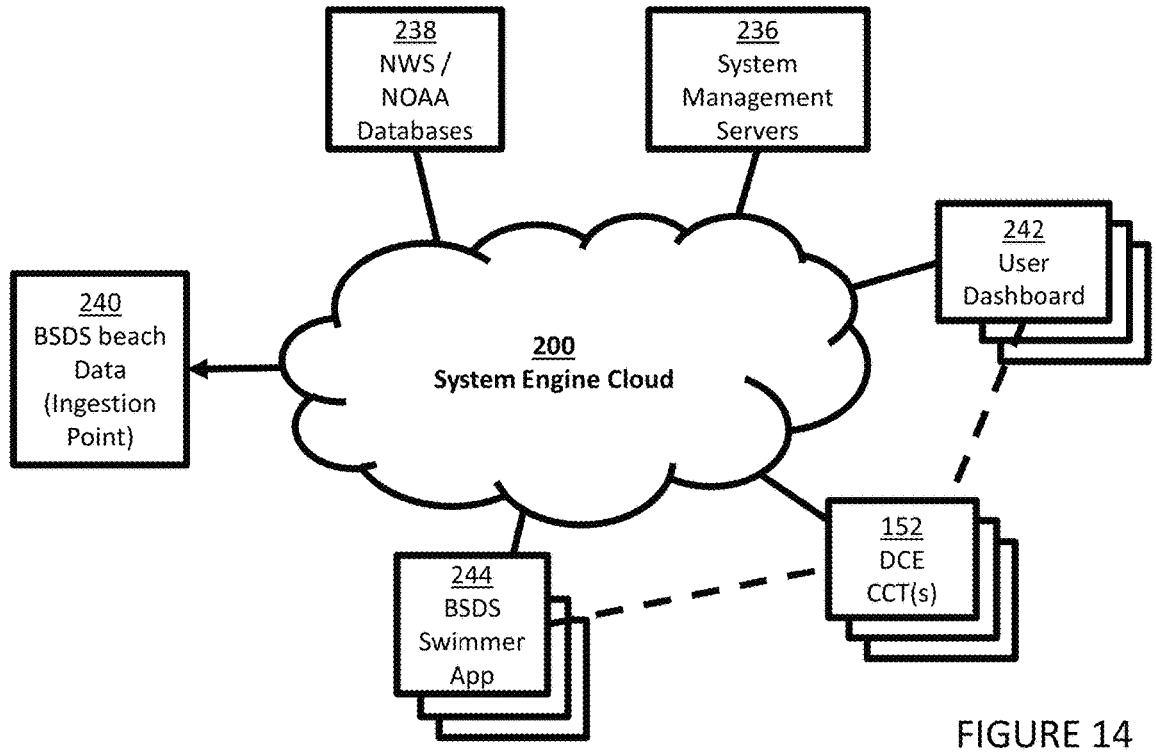
FIG. 14 depicts a graphic of a system engine cloud as it relates to various components in a beach safety system.

FIG. 14 further illustrates a preferred embodiment of a SEC 200 as it further relates to a BSDS. The SEC is a network of different devices connected to different servers therefore eliminating a single point of failure. The SEC can be described as a plurality of servers that process information, send commands, receive data from devices and makes decisions. The BSDS utilizes its own system management server(s) 236 that will run scripts to process the NWS (National Weather Service) data 238 and other data such as BSDS beach data 240 from BSDS sensors located in DCE 152 devices that communicate through the CCT, or user-based dash boards 242 that users can use as the basis to control individual DCE devices 152 on their beach such as warning lights 104. Non-CCT devices can be DCE and therefore send telemetry to the SEC. In some embodiments, a BSDS swimmer app 244 (swimmer app) can be utilized to control devices on the beach or a public application can be used to view weather data accumulated from the DCE devices.

The SEC can comprise more than simply the various DCE devices enumerated on all smart beaches. If a device is not DCE, in some cases it can communicate through a DCE device to access the SEC. The SEC gathers the required forecast information from the NWS (national weather service for swim risk and other information), NOAA, or other websites to communicate this information to the appropriate user dashboards, swimmer applications, and DCE devices. The user dashboards are phone/computer applications that provide the user interface for beach admins and managers to interact with their smart beach. The functionality of the user dashboard is directly tied to the available devices, their hardware features, as well as the available software packages. The swimmer app is a similar application that the designated beach managers or admin have control and can limit information that is seen. The swimmer app is opened when a beachgoer connects to the public WLAN. The swimmer app can comprise terms of service, advertisement, payment interfaces, or any other desired application at discretion of the beach admin.

In this embodiment (FIG. 14), the swimmer application 244 and the user dashboard 242 are also connected directly to the DCE 152 CCT through WLAN communication on the local beach if available. Thus, the swimmers and beach managers can access the SEC 200 through the DCE 152 CCT, this commonly happens if the UE (user equipment) is connected to the beach's WiFi network. The SEC also has various system management servers that perform various high level functions such as device management, data storage, information ingestion and action, data mining, predictive analysis, and many other tasks. The servers interact with, or provide, the various software packages that communicate with the underlying devices and UE. The BSDS beach data 240 ingestion points are an endpoint of analytics, metadata, actionable notifications, or any other information. The data ingestion points are useful for interacting with third party partners, devices, software, websites, etc.

As further indicated in the FIG. 14 embodiment, the dotted lines in the drawing indicate the ability for a user to utilize WLAN (Wi-Fi) communication if it exists to connect directly to one or more CCT 201. In this case, a swimmer on the beach can log into the swimmer application 244 using the beach WIFI and connect directly to the associated central control tower 201. In some embodiments, the user is faced with a WIFI log in page. Alternatively, the user could also be connected to the SEC 200 over cellular.

In short, in various embodiments, the SEC 200 can perform a variety of tasks from controlling simple red/yellow/green warning lights to providing weather data to the NWS and other $3^{rd}$ parties related to each individual beach based on data pulled from BSDS sensors. In this way, the SEC connects: BSDS servers, the NWS, the swimmer applications, consolidates it in a cloud like manner.

BSDS Applications:

There are infinite combinations of the various BSDS devices and, ultimately, the appropriate configuration for a BSDS system is based on the particular beach application. Small remote beaches, for example, do not require a large amount of resources to maintain safe swimming conditions. However, larger beaches may require a more extensive beach network. Other configurations of a BSDS are adapted for applications like piers and boardwalks, water outlets, rock walls, inland lakes, and others. Each application may require different types of sensors that are related to the underlying environmental risks.

Figure 15:
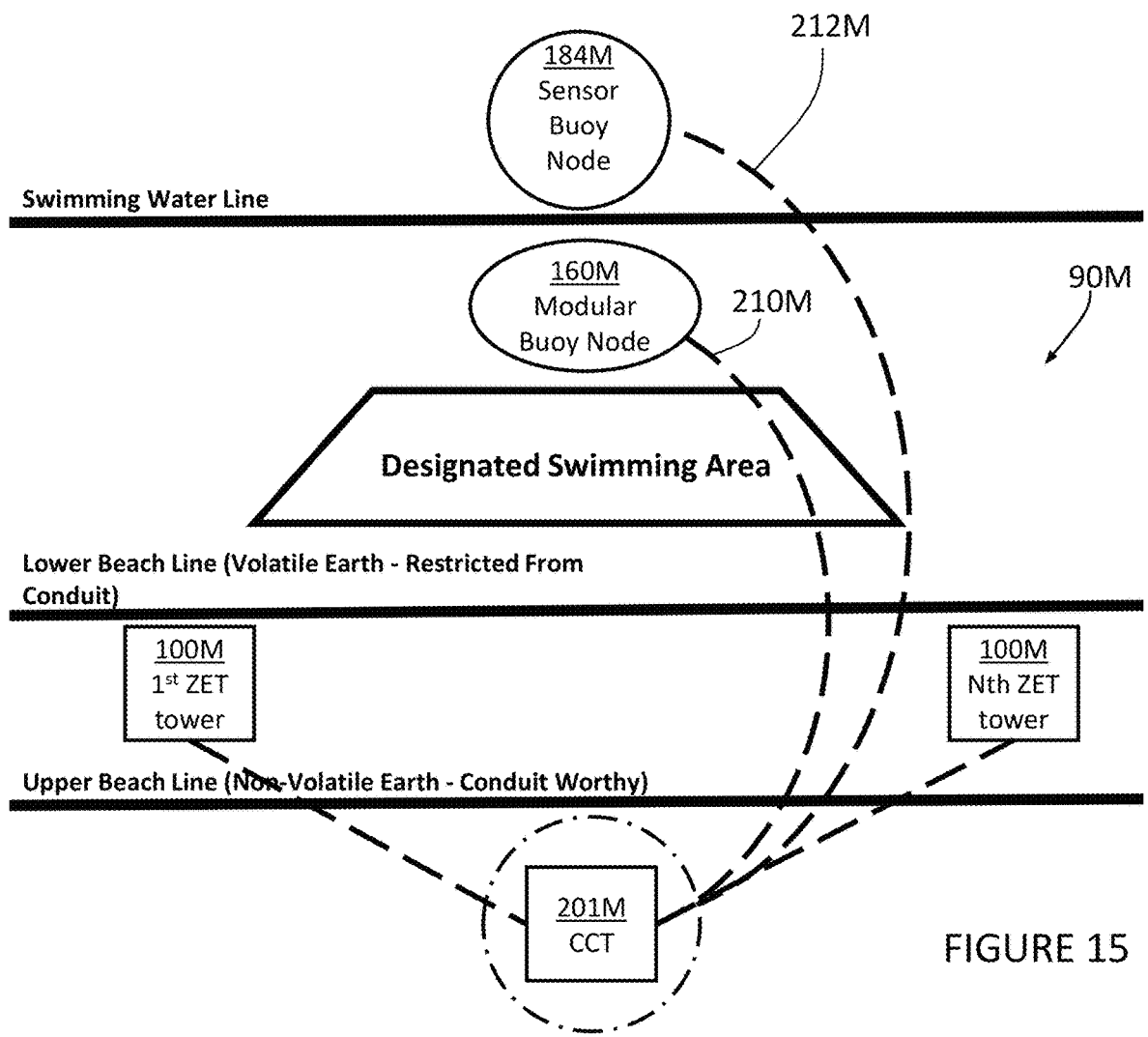
FIG. 15 depicts a graphic of a beach safety system utilized on a small, remote beach that does not have access to power on the beach nor access to DSL.

FIG. 15 illustrates one of the simpler embodiments of a BSDS application. This embodiment is directed to a small, remote beach that does not have access to commercial power on the beach nor access to DSL. This requires all peripheral devices of the BSDS to be powered by some form of a renewable power source. In this embodiment, a single CCT 201M is positioned near the entrance of the beach (such as behind an upper beach line), while one or a few zone emergency towers 100M are scattered at other locations of interest. If power is available but limited to a remote location on firm ground, the CCT 201M can be positioned on the firm ground and connected to the remaining devices using one or more of LRPN 212M and SRPN 210M. Recall, the CCT 201M can be any structure, including a building or simple shanty on the beach. Due to the concerns of power, the peripheral BSDS devices would only be interconnected by a LRPN/SRPN network that is geared towards conserving energy and only issuing emergency and maintenance signals when needed. With such a remote beach, only one or a few buoy nodes, such as modular buoy node 160M, may be practical for the environment. The designated swimming areas would then be within relatively close proximity to the buoy nodes. Again, standard buoys can be used to complete the perimeter. A sensor buoy node can be placed further out past the swimming water line.

Alternatively, assuming commercial power is available but only further up on the beach, the CCT can be located at a main beach entrance and connected to the commercial power. A battery can be utilized as a reserve to send chirp signals out if power is lost to message administrators that power is lost. In a preferred alternative for a simple beach, the CCT 201M has access to both commercial power and a fiber optic line therefore enabling connectivity to the rest of the beach. A zone emergency tower located down the beach can be commercially powered or alternatively solar powered. In this case, the ZET and the CCT utilize SRPN to communicate. WiFi is also an option although less desirable when a tower relies on battery power. Further note in FIG. 15, an upper beach line separates non-volatile earth from the volatile earth of the lower beach, whereas the lower beach line separates the swimming area from the volatile earth of the lower beach. The swimming water line divides the swimming area from the typically deeper non-swimming waters. The upper beach comprises the harder non-volatile ground where conduit to carry commercial power and DSL/fiber optic line can be placed. The conduit is not advised in the volatile ground of the lower beach.

As illustrated further in the minimal case of FIG. 15, one buoy is situated substantially between the first and second zone emergency towers. In an unsafe condition, the warning light on the modular buoy node 160M turns red. This embodiment can include a sensor buoy 184M positioned beyond the swimming water line and utilizes LRPN 212M or the device can be directly cloud enabled for communication.

Pier/Rockwall/Jetty Application:

Another common BSDS 90N application is near a pier structure that has an available commercial power source. A central command tower 201N with automated gate 128N can be positioned at the beach entrance of the pier to allow for the control of the flow of traffic onto the pier. Life ring nodes 123N can stretch the remaining length of the pier to provide for flotation in the event of an emergency. Buoy nodes (I.e. MBN 160N) can also stretch parallel to the pier to provide for designated swimming areas on either side of the pier.

Structural currents are a major issue with piers where the currents run parallel to the pier. Thus, one or more sensing buoy would be effective at determining the level of risk of structural currents and relaying that information to the rest of the BSDS. One or more zone emergency towers 100N can also be positioned at the end of the pier, or integrated into a lighthouse structure itself, providing an emergency light that is visually available, and/or vocal alarms, while walking down the pier.

Scouring is often an issue with certain pier structures and appropriate sensors can be added to the life rings 124N having nodes or other BSDS devices.

Figure 16:
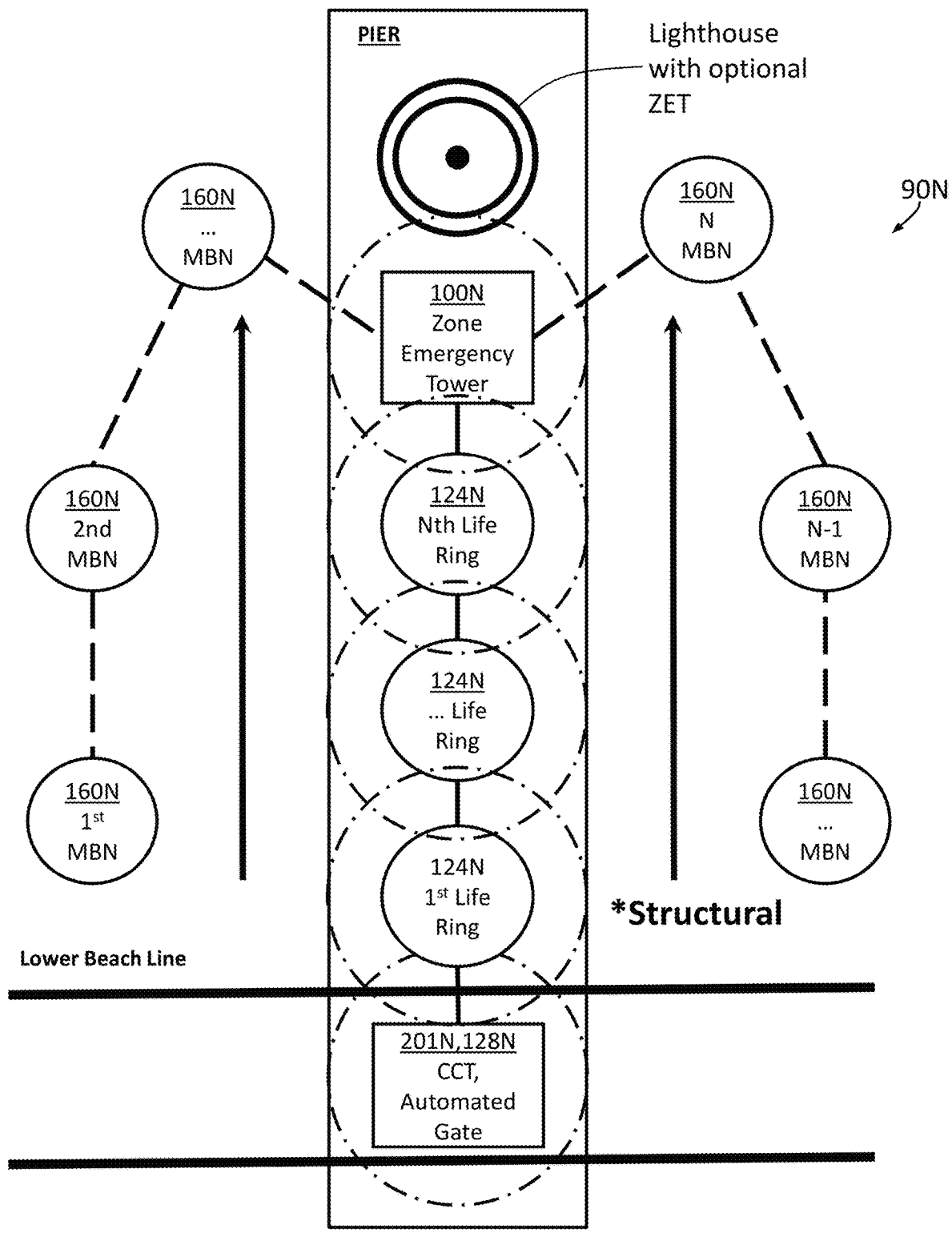
FIG. 16 depicts a graphic of a beach safety system utilized on a pier.

FIG. 16 is example of one embodiment of a BSDS 90N well suited for use near a structure that sticks out into the water perpendicular to the beach. As illustrated, a central command tower 201N controls an automated gate 128N that opens and closes access to the pier. This is important as a large percentage of drownings on the Great Lakes are near piers. In some embodiments, warning lights, signage, and a call button, may suffice. A ZET at the end of the pier is useful in the event an individual becomes stranded at the end of the pier. In some embodiments, repeaters are used to pass the energy from one smart life ring to another. Currents tend to move parallel to the beach then as indicated by the arrows in the drawing, the structural currents typically move away from shore along sides of the pier which makes swimming near this type of structure dangerous.

Figure 17:
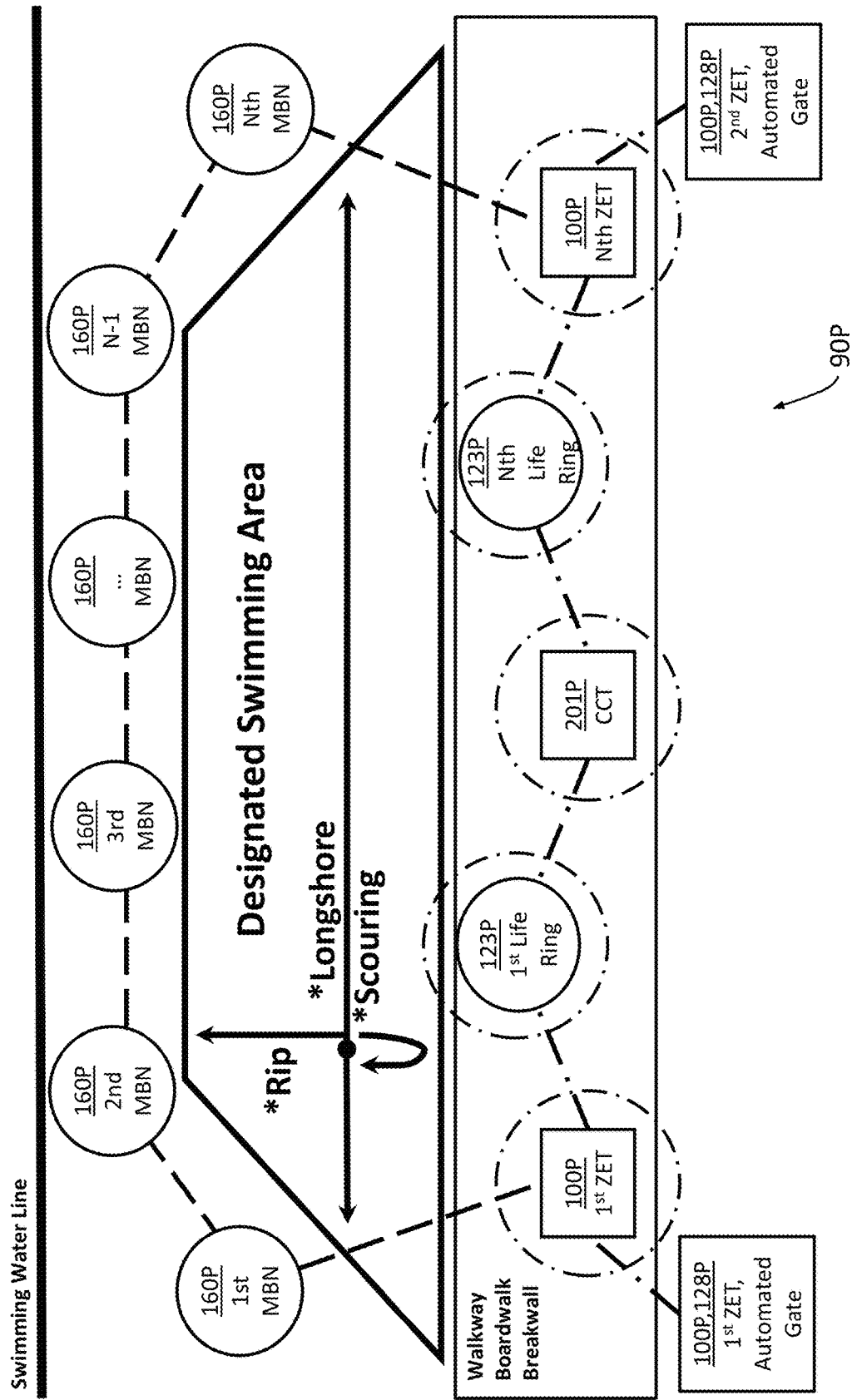
FIG. 17 depicts a graphic of a beach safety system utilized with a break wall, boardwalk, or other structure that runs parallel to a beach, or is in contact with the water directly and acts as a water boundary.

Walkway/Boardwalk/Breakwall Application:

Another common application for a BSDS is in conjunction with a break wall, boardwalk, or other structure that runs parallel to a beach, or is in contact with the water directly and acts as a water boundary. An example of this embodiment is illustrated in FIG. 17. Buoy nodes can be used to form a perimeter around a designated swimming area with buoys chosen based on application. This is illustrated here as the variety of MBNs 160P encircle the designated swimming area in a chain like orientation. Zone emergency towers 100P and life ring nodes 123P can be positioned as needed running along the breakwall, boardwalk, or other similar structure. Also in this embodiment, gate towers (ZET 100P with Automated gate 128P) are positioned to control the flow of individuals onto the structure. Information from each of these peripheral converges onto CCT 201P. In situations where commercial power is available, additional features of the BSDS device 90P and additional communication channel options are available. In preferred embodiments, the location of the CCT 201P should be based on the most optimal location to gain WAN/WWAN access to the greater internet. Again, providing hardwired DSL/Fiber WAN access provides for WLAN WiFi or other equivalent communication protocol to be spread along the structure.

In cases where the structure is adjacent an Ocean or Great Lake, the water will experience rip and longshore currents as indicated in the illustration which will pose a greater risk to swimmers. The buoy nodes can work in conjunction with zone emergency tower cameras to provide data for rip and longshore current estimation and detection, depending on the available software packages. Scouring sensors can also be utilized that hang over the edge of the structure for use with predictive maintenance software packages.

Figure 18A:
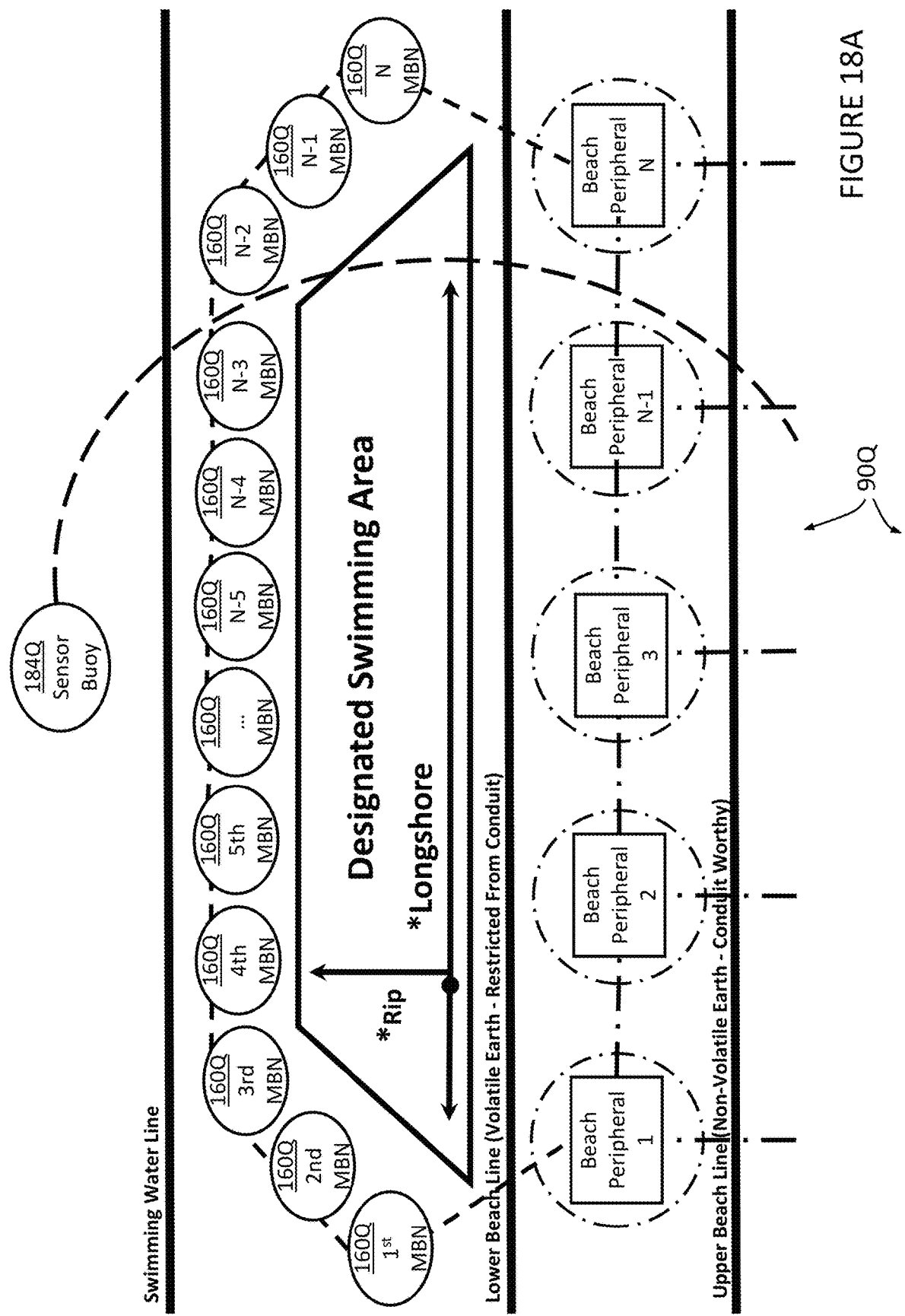
FIG. 18A depicts a beach safety system utilized with a full service beach (the full graphic includes 18A—the upper part, and 18B—the lower part)
Figure 18B:
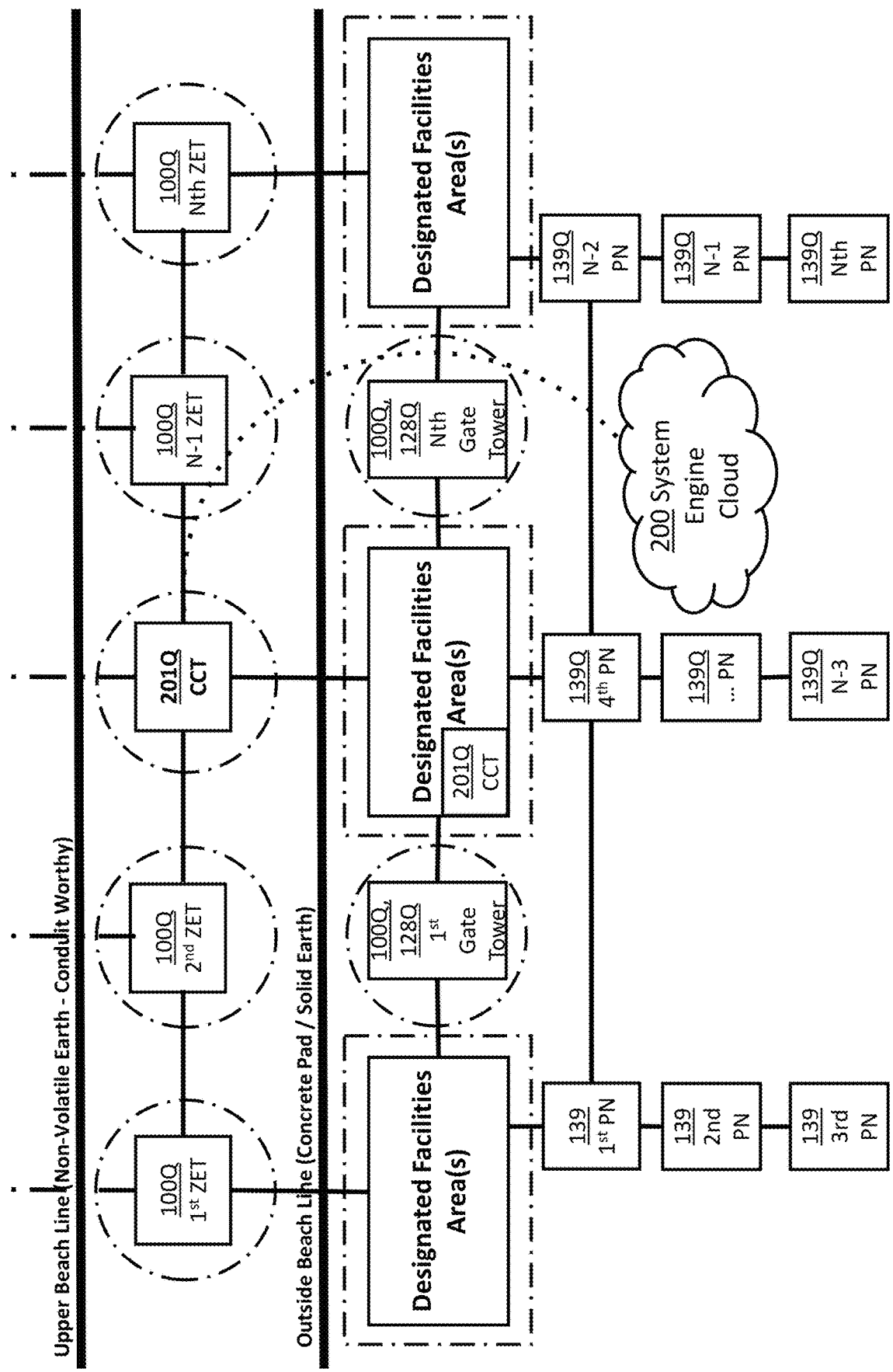
FIG. 18B depicts a beach safety system utilized with a full service beach (the full graphic includes 18A—the upper part, and 18B—the lower part)

Full-Service Beach Application:

Illustrated in FIGS. 18A and 18B is an example embodiment of a BSDS 90Q utilized at a full-service beach. Due to the complexity of the example and to adequately see the text, FIG. 18B represents the lower half and FIG. 18A represents the upper half of this embodiment. Like earlier embodiments, a plurality of modular buoy nodes 160Q are spaced about the perimeter of a designated swimming area. A sensor buoy 184Q can be utilized to collect data as described earlier and is located beyond the swimming water line typically in the deeper water. BSDS peripheral devices which excluding the ZETs, can be any of the BSDS devices previously described that are network connected. These BSDS peripheral devices extend across the upper beach in the non-volatile earth. Examples of the BSDS peripheral devices include but are not limited to smart trash cans which we can have as a base with batteries and/or smart lifeguard towers connected to the internet. These devices can be utilized as repeaters to spread WiFi and can be charged using solar energy. Inward from the beach line (i.e. parking lot, bath building behind outside beach line), gate towers (ZET 100Q with automated gate 128Q) with fencing are utilized to control beach goer traffic. The gate towers can be positioned in a variety of different places preferable in non-volatile ground. BSDS peripheral devices in the form of parking nodes 139Q can be utilized to charge for parking to make money through the BSDS. Other BSDS peripherals include kiosks around bathrooms as may be located in the designated facilities areas, point of sale ATMS, and vending machines near snack areas. In this application, commercial power is typically available along with DSL or fiber optic lines which provide full internet connectivity needed to perform a variety of task related to the BSDS peripherals. A CCT 201Q is located in the bathroom facilities in this embodiment but could be located at other locations in the vicinity. Any devices that are needed in an emergency preferably have DCE to have as backup if the primary communication protocol is lost.

FIG. 19 is a graphical representation of one embodiment of beach monitoring firmware 250 as utilized in the beach monitoring module (BMM) 226 of a BSDS 90. The LAN switch 254 when activated connects the various IP (internet protocol) based features. The SEC gateway 256 connects the BMM 226 to the SEC 200 using protocols such as WWAN/WAN/etc. The 'available device features' box represents a consolidation of the various software functions for each BSDS feature (I.e. IP camera 134, emergency call box 116, audio generator 113, etc). The SEC message handler 258 is a software function in bi-directional communication with SEC servers 260. The NWS forecasts 262 function periodically receives National Weather Service updates from the SEC 200. The 'real time data uploads' 264 is a function pushing streams of data about the various devices including the BMM 226 to the SEC 200. These data streams provide for tracking of the devices over time.

The Input/Output Module 142 is hardware in communication with the I/O control 266 software function. The I/O control provides for interaction between the BMM 226 and the input/output module 142. The rules engine 252 is a programmed set of rules that serve for beach managers to control how the safety system functions based on various inputs such as weather data, camera data, NWS updates, and overrides, etc. The weather sensor function 268 is the function that interacts with various weather sensors 224 and then pushes the data to the SEC 200 automatically.

Beach Peripheral Gateways 270 are the specific hardware gateways used to communicate with other beach peripherals (I.e., ZETs, life ring nodes, etc). The device tree messenger 272 serves to assist the BMM 226 to communicate with many or all beach peripherals at once. This function forms a tree of devices that is used to keep track of the system lay out. The system monitor 274 is a function that lives in the background and monitors the BMM 226 for issues. If an issue arises, the system monitor 274 performs fixes or resets. The finite state machine 276 determines the function of the BMM as the BMM is always in a state: normal operation, active emergency, sleeping, hibernation, reconnecting, debug, and error. The power supply monitor 278 is the software that monitors the power input module 280. This monitor makes sure the device has sufficient power, checks the battery state, and the solar panels if so equipped.

In one embodiment, a method using a BSDS comprises the following steps. Establishing one or more CCTs 300. Establishing one or more ZETs 302. Establishing communication between one of the CCTs and the NWS (National Weather Service) 304. One or more of the following steps can also be used. Notifying beachgoers of danger using warning lights 306 from one or more CCT and/or ZET. Notifying beachgoers of danger using audio alerts 308 from one or more CCT and/or ZET. Using a camera on one or more of a CCT and/or ZET to monitor beach conditions and overall safety 312. Equipping at least one ZET with a solar panel to power the ZET therefore not compromising its position on the beach 314 due to power limitations. Detecting removal of a life ring from a CCT, ZET, or life ring node and notifying first responders through the BSDS 316. Providing an emergency call box on a CCT and/or ZET that connects to emergency personnel upon activation 318. Equipping at least one ZET with a mobile base to move the ZET to a position on the beach that can provide the best beach safety 320.

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A beach safety system comprising:
   at least one central command tower (CCT);
   said CCT in the form of a structure or building configured to house electronic components;
   said central command tower comprising at least one of a warning light and an audio generator operable to alert beachgoers of beach conditions using light or sound, or light and sound;
   said CCT comprising a beach monitoring module having a central processing unit within said beach monitoring module operable to process and initiate a response to beach condition data and emergency signals;
   said CCT comprising a power input module operable to control use and distribution of power received from one or more of an external power source and internal batteries;
   said CCT comprising an input/output module having an actuated switching element within said input/output module operable to electrically couple electronic components in said CCT;
   said CCT comprising at least one of an emergency button and a life ring handle detector;
   said CCT comprising at least one of a network router and gateway mux operable to facilitate message traffic and funnel multiple device signals to a single point;
   said CCT comprising a wireless wide area network (WWAN) gateway for wireless communication to 911 dispatch; and,
   wherein activation of said emergency button alerts emergency personnel via signals sent through said input/output module.

2. The beach safety system of claim 1 further comprising:
   at least one zone emergency tower (ZET);
   said ZET in the form of an elongate tower post configured to be secured upright to the ground and operable to house electronic components of said beach safety system;

said ZET comprising at least one of a warning light and an audio generator operable to alert beachgoers of beach conditions using light or sound, or light and sound;

said ZET comprising a power input module operable to control use and distribution of power received from one or more of an external power source, a solar collector, and internal batteries;

said ZET comprising an input/output module having an actuated switching element within said input/output module operable to electrically couple electronic components in said ZET;

said ZET comprising at least one of an emergency button and a life ring handle detector;

said ZET comprising a control module comprising a central processing unit containing application firmware for operation of said ZET;

said ZET comprising at least one or more of a short range private network (SRPN) and long range private network (LRPN) operable for communicating with beach devices.

3. The beach safety system of claim 1 further comprising:

at least one life ring node operable for alerting emergency personnel upon removal of a life ring;

said life ring node comprising a life ring;

said life ring node comprising one or more of a short range private network (SRPN) and a long range private network (LRPN) operable for communicating with beach devices of the beach safety system;

said life ring node comprising an input/output module having an actuated switching element within said input/output module operable to electrically couple electronic components in said life ring node;

said life ring node comprising at least one of a warning light and an audio generator operable to alert beachgoers of beach conditions using light or sound, or light and sound;

said life ring node comprising a power input module operable to control use and distribution of power received from one or more of an external power source, solar collector, and internal batteries;

said life ring node comprising an input/output module operable to electrically couple electronic components in said life ring node;

said life ring node comprising a control module comprising a central processing unit containing application firmware for operation of said life ring node; and said life ring node comprising a latch detection module operable to sense removal of said life ring.

4. The beach safety system of claim 1 whereas said at least one CCT is powered through hardwire extending to the CCT.

5. The beach safety system of claim 1 whereby said CCT further comprises a wireless transmitter in communication with one or more of a National Weather Service and NOAA databases.

6. The beach safety system of claim 2 whereas said at least one ZET comprises a solar collector extending from said ZET operable to provide power to said ZET.

7. The beach safety system of claim 2 whereby said warning light is in the form of a plurality of selectively illuminated colored warning lights operable to alert beachgoers of beach safety levels.

8. The beach safety system of claim 2 whereby at least one of said at least one zone emergency tower further comprises a callbox.

9. The beach safety system of claim 2 whereby at least one of said at least one zone emergency tower further comprises a camera operable to monitor activity surrounding said zone emergency tower.

10. The beach safety system of claim 2 whereby said at least one zone emergency tower further comprises a removable life ring supported by said zone emergency tower.

11. The beach safety system of claim 2 whereby a life ring node is integrated with at least one of said at least one CCT and at least one ZET.

12. The beach safety system of claim 2 whereby at least one life ring node operates distanced from said CCT and said ZET.

13. The beach safety system of claim 2 whereby said at least one zone emergency tower is mobile for relocating on various portions of a beach.

14. A method of beach safety comprising the steps of:

establishing at least one central command tower (CCT) at a beach whereby said CCT is in the form of a structure or building operable to house electronic components, and said CCT comprising at least one of a warning light and audio generator operable to alert beachgoers of beach conditions using one or more of light and sound, and said CCT comprising a beach monitoring module having a central processing unit within said beach monitoring module operable to process and initiate a response to beach condition data and emergency signals, and said CCT comprising a power input module operable to control use and distribution of power received from one or more of an external power source, solar collector, and internal batteries, and said CCT comprising an input/output module having an actuated switching element within said input/output module operable to electrically couple electronic components in said CCT, and said CCT comprising at least one of an emergency button and a life ring handle detector, and said CCT comprising at least one of a network router and gateway mux operable to facilitate message traffic and funnel multiple device signals to a single point, and said CCT comprising a wireless wide area network (WWAN) gateway for wireless communication to 911 dispatch;

establishing at least one zone emergency tower (ZET) spaced from said CCT at said beach front whereby said zone emergency tower is in the form of an elongate tower post configured to be secured upright in relation to the ground and operable to house electronic components, and said ZET comprising at least one of a warning light and audio generator operable to alert beachgoers of beach conditions using one or more of lights and sounds, and said ZET comprising a power input module operable to control use and distribution of power received from one or more of an external power source and internal batteries, and said ZET comprising an input/output module operable to electrically couple electronic components in said ZET, and said ZET comprising at least one of an emergency button and a life ring handle detector, and said ZET comprising a control module comprising a central processing unit containing the device's application firmware, and said ZET comprising at least one or more of a short range private network (SRPN) and long range private network (LRPN) operable for communicating with beach devices;

establishing communication between the at least one CCT and the at least one ZET through a network;

establishing communication between the CCT and the National Weather Service; and, wherein activation of at least one of said CCT and ZET emergency buttons alerts emergency personnel via signals sent through said input/output module.

15. The method of beach safety of claim 14 further comprising the step of:

notifying beachgoers of beach safety levels by illuminating at least one of said warning lights of a color coinciding with current safety conditions on one or more of said at least one CCT and said at least one ZET.

16. The method of beach safety of claim 14 further comprising the step of:

utilizing a camera on one or more of said at least one CCT and said at least one ZET to monitor at least one of wave activity, water currents, and distressed swimmers.

17. The method of beach safety of claim 14 further comprising the step of:

detecting the removal of a life ring from one of said at least one CCT and said at least one ZET and notifying first responders.

18. The method of beach safety of claim 14 further comprising the step of:

activating a callbox on at least one said CCT and said at least one ZET to communicate directly to emergency personnel through one or more CCT and ZET electronic communication gateways.

19. The method of beach safety of claim 14 further comprising the step of:

utilizing weather sensors located on components of the beach safety system to monitor weather conditions and sending the associated weather data from the sensors to the National Weather Service.

20. The method of beach safety of claim 14 further comprising the step of:

utilizing the audio generator located on at least one of said at least one CCT and at least one ZET to audibly alert beachgoers of dangerous weather conditions.

21. The method of beach safety of claim 14 further comprising the step of:

utilizing one or more solar collector mounted to said at least one ZET to power the ZET.

22. The method of beach safety of claim 14 further comprising the step of:

utilizing a mobile base on said at least one ZET to move the ZET with mobile base from one location to another on a beach.

* * * * *